US009775366B2

(12) United States Patent
Wolfschoon-Pombo et al.

(10) Patent No.: US 9,775,366 B2
(45) Date of Patent: Oct. 3, 2017

(54) PROCESS FOR PRODUCING CREAM CHEESE

(71) Applicants: Alan Frederick Wolfschoon-Pombo, Munich (DE); Thomas Demmer, Munich (DE); Katerina Milosavljevic, Bad Fallingbostel (DE); Thomas L. Spiegel, Munich (DE); Christian Hammer, Munich (DE)

(72) Inventors: Alan Frederick Wolfschoon-Pombo, Munich (DE); Thomas Demmer, Munich (DE); Katerina Milosavljevic, Bad Fallingbostel (DE); Thomas L. Spiegel, Munich (DE); Christian Hammer, Munich (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 0 days.

(21) Appl. No.: 13/859,404

(22) Filed: Apr. 9, 2013

(65) Prior Publication Data

US 2013/0273202 A1  Oct. 17, 2013

Related U.S. Application Data

(60) Provisional application No. 61/714,026, filed on Oct. 15, 2012.

(30) Foreign Application Priority Data

Apr. 10, 2012  (EP) .................................... 12163565

(51) Int. Cl.
| A23C 19/076 | (2006.01) |
| A23C 19/045 | (2006.01) |
| A23C 19/05  | (2006.01) |
| A23C 19/09  | (2006.01) |
| A23C 19/032 | (2006.01) |
| A23C 19/06  | (2006.01) |
| A23C 19/028 | (2006.01) |
| A23C 19/08  | (2006.01) |

(52) U.S. Cl.
CPC ........ *A23C 19/076* (2013.01); *A23C 19/0323* (2013.01); *A23C 19/045* (2013.01); *A23C 19/053* (2013.01); *A23C 19/06* (2013.01); *A23C 19/0917* (2013.01); *A23C 19/0921* (2013.01); *A23C 19/028* (2013.01); *A23C 19/0285* (2013.01); *A23C 19/08* (2013.01); *A23C 2210/20* (2013.01)

(58) Field of Classification Search
CPC .................................................. A23C 19/076
USPC .................................................. 426/36, 582
See application file for complete search history.

(56) References Cited

U.S. PATENT DOCUMENTS

| 4,341,801 | A | * | 7/1982 | Weissman ........................ 426/40 |
| 4,559,231 | A |   | 12/1985 | Bjerre |
| 4,897,277 | A |   | 1/1990 | Dieu et al. |
| 5,079,024 | A |   | 1/1992 | Crane |
| 5,096,731 | A | * | 3/1992 | Singer ........................ A23J 3/00 426/583 |
| 5,334,398 | A |   | 8/1994 | Sueyasu |
| 5,429,829 | A |   | 7/1995 | Ernster |
| 5,470,593 | A |   | 11/1995 | Meilinger et al. |
| 6,399,140 | B1 |  | 6/2002 | Allen |
| 6,406,736 | B1 |  | 6/2002 | Han |
| 6,468,574 | B1 |  | 10/2002 | Zettier |
| 6,558,716 | B1 |  | 5/2003 | Kent et al. |
| 6,605,311 | B2 |  | 8/2003 | Villagran |
| 6,689,402 | B1 |  | 2/2004 | Nauth |
| 6,767,575 | B1 |  | 7/2004 | Huss |
| 6,916,496 | B2 |  | 7/2005 | Koka |
| 7,026,004 | B2 |  | 4/2006 | Loh |
| 7,258,886 | B2 | * | 8/2007 | Brue et al. ........................ 426/582 |
| 7,329,424 | B2 |  | 2/2008 | Koka |
| 7,579,029 | B2 |  | 8/2009 | Wolfschoon-Pombo |
| 2002/0039617 | A1 | | 4/2002 | Villagran |
| 2002/0155203 | A1 | | 10/2002 | Jensen |
| 2004/0067296 | A1 | | 4/2004 | Loh |
| 2004/0151802 | A1 | | 8/2004 | Koka |
| 2004/0151803 | A1 | | 8/2004 | Wolfschoon-Pombo |
| 2005/0244541 | A1 | | 11/2005 | Koka |
| 2006/0141096 | A1 | * | 6/2006 | Gutknecht ............ A23C 13/14 426/36 |
| 2006/0286209 | A1 | | 12/2006 | Sweley |
| 2007/0077332 | A1 | * | 4/2007 | Moran ................ A23C 9/1236 426/36 |
| 2007/0231453 | A1 | | 10/2007 | Bovetto |

(Continued)

FOREIGN PATENT DOCUMENTS

| DE | 3337209 A1 | 4/1984 |
| DE | 4016342 A1 | 11/1990 |

(Continued)

OTHER PUBLICATIONS

EP-1-752-046—Machine Translation.*
Brans, G. et al. 2004. J. Membrane Sci., 243: 263-272.*
Covacevich, H. R. et al. 1977. J. Fd. Sci., 42: 1362-1372.*
Covacevich, H. R. et al. J. Food Sci. 42: 1362-1364 (1977).*
European Patent Office, European Search Report dated May 28, 2013 for European Patent Application 13162334.0 (4 pages).
European Patent Office, Extended European Search Report and Written Opinion dated Jun. 6, 2013 for European Patent Application 13162334.0 (6 pages).

(Continued)

*Primary Examiner* — Hamid R Badr
(74) *Attorney, Agent, or Firm* — Fitch, Even, Tabin & Flannery LLP

(57) ABSTRACT

The present disclosure relates to a process for producing cream cheese using a specific combination of milk and milk fractions. It further relates to cream cheese which is characterized by a unique combination of levels of minerals, lactose and protein and which may be obtained by the process of the present disclosure.

18 Claims, 14 Drawing Sheets

(56) References Cited

U.S. PATENT DOCUMENTS

| | | |
|---|---|---|
| 2008/0038424 A1 | 2/2008 | Krusemann |
| 2008/0311269 A1 | 12/2008 | Fedaravicius |
| 2009/0041920 A1 | 2/2009 | Eibel |
| 2009/0123601 A1 | 5/2009 | Wolf-Schoon-Pompo |
| 2010/0047423 A1 | 2/2010 | Kruesemann |
| 2010/0062124 A1 | 3/2010 | Phillips |
| 2010/0086663 A1* | 4/2010 | Brandstetter ........ A23C 9/1307 426/570 |
| 2010/0098820 A1 | 4/2010 | Imai et al. |
| 2010/0303958 A1 | 12/2010 | Ur-Rehman |
| 2011/0020495 A1 | 1/2011 | Wolfschoon-Pombo |

FOREIGN PATENT DOCUMENTS

| | | |
|---|---|---|
| DE | 102004041770 A1 | 3/2006 |
| DE | 102005037503 B4 | 7/2007 |
| EP | 0293453 A1 | 12/1988 |
| EP | 0536612 B1 | 7/1995 |
| EP | 0673203 A1 | 9/1995 |
| EP | 0825816 A1 | 3/1998 |
| EP | 1049380 A1 | 11/2000 |
| EP | 1 249 176 A1 | 10/2002 |
| EP | 1154700 B1 | 5/2003 |
| EP | 1061811 B1 | 8/2004 |
| EP | 1 698 231 A1 | 9/2006 |
| EP | 1 733 622 A1 | 12/2006 |
| EP | 1 752 046 A1 | 2/2007 |
| EP | 1784083 A1 | 5/2007 |
| EP | 1799046 A2 | 6/2007 |
| EP | 1898714 A1 | 3/2008 |
| EP | 2217079 A1 | 8/2010 |
| EP | 2 269 466 A2 | 1/2011 |
| EP | 2124583 B1 | 1/2012 |
| EP | 1407673 B1 | 5/2014 |
| EP | 1980154 B1 | 10/2014 |
| EP | 1292196 B2 | 8/2015 |
| EP | 1943907 B9 | 8/2015 |
| EP | 1416803 B2 | 6/2016 |
| EP | 2052626 B1 | 11/2016 |
| FR | 2 889 794 A1 | 2/2007 |
| GB | 891098 A | 3/1962 |
| HU | 202079 B | 2/1991 |
| JP | 2308756 A | 12/1990 |
| JP | 2004105048 A | 4/2004 |
| JP | 2011024574 A | 2/2011 |
| JP | 2012040017 A | 3/2012 |
| NZ | 547883 A | 4/2008 |
| NZ | 567398 A | 11/2009 |
| RU | 2422030 C1 | 6/2011 |
| WO | 8804141 A1 | 6/1988 |
| WO | 9413148 A1 | 6/1994 |
| WO | 96/35336 A1 | 11/1996 |
| WO | 99/37162 A1 | 7/1999 |
| WO | 99/40798 A1 | 8/1999 |
| WO | 9957988 A1 | 11/1999 |
| WO | 0048473 A1 | 8/2000 |
| WO | 0197629 A2 | 12/2001 |
| WO | 02080696 A1 | 10/2002 |
| WO | 02089592 A1 | 11/2002 |
| WO | 01097629 A8 | 11/2003 |
| WO | 2005/002350 A1 | 1/2005 |
| WO | 2006024395 A1 | 3/2006 |
| WO | 2006034857 A2 | 4/2006 |
| WO | 2006057968 A1 | 6/2006 |
| WO | 2006135983 A1 | 12/2006 |
| WO | 2008007769 A1 | 1/2008 |
| WO | 2008063115 A1 | 5/2008 |
| WO | 2009/059266 A1 | 5/2009 |
| WO | 2009/150183 A1 | 12/2009 |

OTHER PUBLICATIONS

Notice of Opposition to European Patent EP 2 649 884 B1 filed Nov. 3, 2016 by Opponent Compagnie Gervais Danone (34 pages).

Opposition Document D2, Food and Drug Administration, CFR—Code of Federal Regulations, Title 21, § 133.133, Cream Cheese (Apr. 1, 2011 Edition) (2 pages).

Opposition Document D4, Nelson B.K. and Barbano D.M., "A Microfiltration Process to Maximize Removal of Serum Proteins from Skim Milk Before Cheese Making," Journal of Dairy Science, 2005, vol. 88(5):1891-1900.

Opposition Document D9, Database GNPD, Mintel, "Filled Blueberry Bagels," Nov. 2008 (3 pages).

Opposition Document D10, Phadungath Chanokphat, "Cream cheese products: A review," Journal of Science and Technology, 2005, 27(1):191-199.

Opposition Document D11, Reply to Office Action of Jul. 29, 2014 filed in U.S. Appl. No. 13/859,404 on Dec. 29, 2014 (12 pages).

Opposition Document D12, Database GNPD, Mintel, "Matinal Queijo Fresco (Fresh Cheese)," Dec. 2010 (3 pages).

Opposition Document D13, AKOH Casimir, "Fat Replacers," Food Technology, Mar. 1998, 52(3):47-53.

Opposition Document D14, Mistry Vikram V., "Low fat cheese technology," International Dairy Journal, 2001, 11:413-422.

Opposition Document D15, Roller Sibel and Jones Sylvia A., "Handbook of Fat Replacers," CRC Press LLC, 1996, ISBN: 9780849325120, Chapter 8: Microparticulated Proteins as Fat Mimetics (25 pages).

Opposition Document D16, Smith Karen, "Dried Dairy Ingredients," by the Wisconsin Center for Dairy Research, May 15, 2008 (60 pages).

Opposition Document D17, Food and Drug Administration, CFR—Code of Federal Regulations, Title 21, § 184.1979c, Whey Protein Concentrate (Apr. 1, 2011 Edition) (3 pages).

Opposition Document D18, Database GNPD, Mintel, "Queso Blanco Light," Dec. 1999 (2 pages).

Opposition Document D19, Maubois J.L. and Mocquot G., Application of Membrane Ultrafiltration to Preparation of Various Types of Cheese, Journal of Dairy Research, 1975, 58(7):1001-1007.

Opposition Document D20, Garem Anita et al., "Cheesemaking properties of a new dairy-based powder made by a combination of microfiltration and ultrafiltration," Lait, 2000, 80:25-32.

Andre, Eck: "Le fromage", Jan. 1, 1984 (Jan. 1, 1984), CNIEL, Paris, XP002683175, pp. 414-418.

Andres, Cal: "Line of dairy proteins is highly functional", Food Processing, Putman Media, US, vol. 45, no. 12, Nov. 1, 1984 (Nov. 1, 1984), pp. 66-67, XP009162378, ISSN: 0015-6523.

Anonymous: "Laugensnack mit Frischkase", Apr. 6, 2006 (Apr. 6, 2006), XP002683172, Retrieved from the Internet: URL:http://www.abzonline.de/praxis/,604209807.html, [retrieved on Sep. 4, 2012].

Cerna, M: "Uses of caseinates in dairy products. (translated)", PRMYSL Potravin, MK Press, Komarov, CZ, vol. 31, No. 12, Jan. 1, 1980 (Jan. 1, 1980), pp. 690.130-696.136, XP009162377, ISSN: 0033-1988.

Database GNDP [Online] Mintel; Nov. 1, 2008 (Nov. 1, 2008), Anonymous: "Filled Blueberry Bagels", XP002683173, retrieved from www.gnpd.com, Database accession No. 1001377.

Database GNPD [Online] Mintel; Aug. 1, 2010 (Aug. 1, 2010), Anonymous: "Cream Cheese Stuffed Bread", XP002683174, retrieved from www.gnpd.com, Database accession No. 1387323.

European Patent Office, Extended European Search Report dated Sep. 21, 2012, from corresponding EP Patent Application No. 12163565.0, 10 pages.

Frank Kosikwski: "Cheese and fermented milk foods", Jan. 1, 1978 (Jan. 1, 1978), Kosikowski and Associates, New York, XP002683171, pp. 144-147.

Kiyoshi Yokota, "Process of Daily Products Using Membrane Technology," A technical journal on food chemistry & chemicals, vol. 19, No. 4, pp. 79-84, 2003 (English abstract attached) (7 pages).

Kunio Yamauchi et al., Milk Sago Jiten, Asakura Publishing Co., Ltd., 1992, pp. 378-380 (English abstract attached) (5 pages).

Real Del Sol E et al: "Use of okara and cow's milk for producing a cream cheese analogue", Alimentaria, CSIC, ES, No. 331, Jan. 1, 2002 (Jan. 1, 2002), pp. 39-42, XP009162524, ISSN: 0300-5755 (Machine translation attached).

(56) References Cited

OTHER PUBLICATIONS

USDA: "Cream cheese", National Nutrient Database for Standard References, Mar. 30, 2012 (Mar. 30, 2012), pp. 1-5, XP002683170, Retrieved from the Internet: URL:http://ndb.nal.usda.govindbf-foods/show/17, [retrieved on Sep. 4, 2012].

\* cited by examiner

Fig. 8

|  | Example 9 |
|---|---|
| Dairy Blend | |
| Milk | 31.90% |
| Cream (cream + Concentrated Milk Fat) | 44.80% |
| MF retentate (casein enriched fraction) | 23.30% |
| | 100.00% |
| Cultured Dairy Blend | 75.66% |
| dairy ingredients from recovered co-products | |
| (WPC + evaporated lactose) | 23.00% |
| Gums | 0.45% |
| Seasonings | 0.88% |
| Preservatives + fortification | 0.01% |
| | 100.00% |
| Finished product composition | |
| Solids | 32.80% |
| fat | 20.00% |
| protein | 5.00% |
| lactose | 5.10% |
| whey protein/true protein | 51.20% |

Fig. 10

|  | Example 10 |
|---|---|
| Dairy Blend | |
| Milk | 76.84% |
| Cream | 8.14% |
| MF retentate (casein enriched fraction) | 15.02% |
|  | 100.00% |
| | |
| Concentration to 26% solids | |
| | |
| Cultured Concentrated Dairy Blend | 77.70% |
| dairy ingredients from recovered co-products | |
| (WPC + evaporated lactose) | 21.00% |
| Gums | 0.50% |
| Seasonings | 0.80% |
|  | 100.00% |
| Finished product composition | |
| Solids | 26.70% |
| fat | 10.20% |
| protein | 7.90% |
| lactose | 5.20% |
| whey protein/true protein | 35.55% |

Fig. 12

|  | Example 11 |
|---|---|
| Dairy Blend | |
| Concentrated lactose | 8.30% |
| Cream | 27.60% |
| MF retentate (casein enriched fraction) | 64.10% |
|  | 100.00% |
|  | |
| Cultured Dairy Blend | 81.70% |
| dairy ingredients from recovered co-products | |
| WPC | 17.00% |
| Gums | 0.50% |
| Seasonings | 0.80% |
|  | 100.00% |
| Finished product composition | |
| Solids | 27.80% |
| fat | 10.20% |
| protein | 8.60% |
| lactose | 5.30% |
| whey protein/true protein | 32.70% |

Fig. 14

|  | Example 12 |
|---|---|
| Dairy Blend | |
| skimMilk | 82.17% |
| Cream | 3.10% |
| MF retentate (casein enriched fraction) | 14.73% |
|  | 100.00% |
| Concentration to 21.9% solids | |
| Cultured Concentrated Dairy Blend | 53.50% |
| dairy ingredients from recovered co-products (WPC + evaporated lactose) | 45.00% |
| Gums | 0.70% |
| Seasonings | 0.80% |
|  | 100.00% |
| Finished product composition | |
| Solids | 23.70% |
| fat | 2.90% |
| protein | 11.00% |
| lactose | 6.00% |
| whey protein/true protein | 52.10% |

PROCESS FOR PRODUCING CREAM CHEESE

CROSS-REFERENCE TO RELATED APPLICATION

This application claims priority to European Patent Application No. 12163565.0, filed Apr. 10, 2012, and U.S. Patent Application No. 61/714,026, filed Oct. 15, 2012, both of which are incorporated herein by reference in their entirety.

FIELD

The present application relates to a process for producing cream cheese and related cream cheese type products using a specific combination of dairy and dairy fractions. The process allows to better tailor, standardize and control the composition and properties of the final cream cheese, including its flavor and texture. In addition, the process enables a more complete use of the initial dairy materials, such as raw milk, allowing to produce cream cheese without the need to add independently produced dairy fractions and/or having to discard others. The present application also relates to cream cheese and related products which are characterized by a unique combination of levels of minerals, lactose and protein and which may be obtained by means of the process of the application. The present application furthermore relates to a process for preparing a food product comprising cream cheese and one or more additional food product components.

BACKGROUND

In general, conventional processes for producing cream cheese starts from fat-adjusted milk, for example a combination of usually pasteurized raw milk or skim milk with cream. The process typically comprises the following steps:
pasteurizing and homogenizing the milk blend,
fermenting the milk blend with lactic acid bacteria,
separating the fermented product into a curd fraction and a whey fraction and removing the whey fraction,
optionally adding further liquid or solid (powdery) cream cheese ingredients, such as salt, stabilizers, flavoring agents, sweet whey powder, and sweet or sour cream, to the curd fraction,
heating and homogenizing the resulting mixture, and
filling and packaging the resulting cream cheese.

In the dairy field, centrifugation is one major method for separating dairy products into fractions according to their specific gravity. For example, milk can be separated into a high-fat cream fraction having a relatively lower density and a low-fat skim milk fraction having a relatively higher density. More recently, membrane separation technologies such as microfiltration, ultrafiltration, nanofiltration and reverse osmosis have been introduced for fractionating dairy products according to the particle size and/or molecular weight of their respective components.

For example, US 2010/0098820 A1 discloses the use of a microfiltration membrane to concentrate skim milk, providing a relatively low whey protein/casein ratio in the obtained concentrated milk. Likewise, WO 2009/059266 A1 describes a process for the production of casein, comprising a step of subjecting skim milk to microfiltration to provide a retentate having a high casein content and being useful for cheese making.

WO 99/37162 A1 relates to a method for preparing cheese, inter alia comprising a step of concentrating milk by means of reverse osmosis or nanofiltration in combination with ultrafiltration and optionally diafiltration and/or microfiltration to produce a concentrated milk having an increased casein content.

EP 2 269 466 A2 describes a method of making a high fat cream cheese product from a standardized milk base using lactic acid bacteria fermentation. The fermented milk base is subjected to ultrafiltration to form a retentate and a permeate wherein the retentate has a fat content which is higher than that of the standardized milk base.

EP 1 752 046 A1 describes a method for producing concentrated and fermented dairy products, in particular cream cheese, inter alia comprising a step of separating fermented process milk by means of microfiltration into an acidified permeate and an acidified retentate, which acidified retentate is further processed into the desired dairy product. Likewise, U.S. Pat. No. 4,897,277 describes the use of microfiltration to separate curd from whey.

WO 96/35336 A1 describes a process for producing whey protein concentrate using an ultrafiltration step to remove water and small water-soluble molecules from whey.

WO 99/40798 A1 describes a process for producing a whey salt powder, wherein whey or an ultrafiltration permeate of milk or whey is subjected to nanofiltration, and the obtained permeate is further concentrated by evaporation or a combination of reverse osmosis and evaporation and dried.

Despite the prior description and use of membrane separation technology in the dairy field, the application of such technology has focused on specific, separate aspects of the cheese making process only, rather than considering the cheese production as a whole. In particular, it must be emphasized that a membrane separation process will usually provide two fractions, namely a retentate and a permeate. However, the prior art application of membrane separation technology has mainly focused on producing one fraction which can be used or provided in a beneficial manner, without considering options for using the remaining other fraction. In addition to such considerations, it has been observed that there is still room for improvement in the manufacture of cream cheese in terms of flavor and texture properties of the final product.

In view of the above, it may be desirable to provide a process for producing cream cheese and related products from dairy and dairy fractions, allowing to better tailor, standardize and control the composition and properties of the final cream cheese, including its flavor and texture. In addition, it may be desirable to provide a process for producing cream cheese and related products which allows for better and more complete use of the starting dairy, including its major fractions such as casein, whey protein, fat, lactose and minerals. The process for producing cream cheese and related products may be extended to a process for preparing a food product, namely by combining the resulting cream cheese with one or more additional food product components. Finally, it may be preferable to provide cream cheese with unique sensory properties, at the same or a reduced fat content as compared to conventional cream cheese.

SUMMARY

The present application relates to a process for producing cream cheese and related products, said process comprising the steps of preparing a dairy blend, subjecting the dairy blend to fermentation, and preparing cream cheese from the fermented dairy blend, wherein a casein-enriched dairy/milk fraction is used in the preparation of the dairy blend. The casein enriched dairy/milk fraction includes a greater amount of casein than found in standard whole milk. In one form, the casein-enriched fraction includes at least about 6.5% casein.

In one form, the casein-enriched milk fraction is obtained by fractionating skim milk, further producing a whey protein fraction. The skim milk may be obtained by separation of raw milk, further producing cream which may be used, inter alia, in the preparation of the milk blend which is used in the process of the present application. The whey protein fraction may be further separated to obtain a whey protein concentrate fraction and a lactose/minerals fraction. The whey protein concentrate fraction may be used, optionally after further processing (e.g., particulation or functionalization), as a cream cheese ingredient which may be added to the curd in the appropriate stage of the process, such as after the fermentation step.

In another form, the lactose/minerals fraction can be further separated into lactose and minerals fractions, or concentrated to a concentrated lactose/minerals fraction. The lactose, minerals and concentrated lactose/minerals fractions may be used as cream cheese ingredients, for example for addition to the curd after the fermentation step.

In yet another form, cream, sour cream (such as obtained by lactic acid fermentation) or a mixture thereof can be added as a cream cheese ingredient to the curd in the appropriate stage of the process of the present application, such as after the fermentation step. Here, the cream, such as found after fermentation, can be used as the cream cheese ingredient.

In a further aspect, a cream cheese which is provided having the following properties:
a (Ca+P)/casein weight ratio of ≥0.05
a whey protein/true protein weight ratio of ≥25.0%
a K content of ≥140 mg/100 g and
a lactose content of ≥3.5 g/100 g.

In particular, the above cream cheese may be prepared as described herein.

In one form, it may be possible to tailor, standardize and control the composition and properties of the final cream cheese, inter alia by using a casein-enriched dairy/milk fraction in the preparation of the initial dairy blend and by adding other dairy fractions in the later stages of the process, which dairy fractions may be obtained from by-products of the process. In addition, it has been found that the amounts of both fat and proteins which are traditionally associated with the whey after fermentation and centrifugal separation are significantly reduced and are retained in the curd. This may improve the profitability of the cream cheese manufacture and furthermore has beneficial effects on the flavor of the resulting cream cheese.

BRIEF DESCRIPTION OF THE DRAWINGS

FIG. 8 is a table illustrating the ingredient breakdown and composition for the cream cheese produced according to the process described in FIG. 7;

FIG. 10 is a table illustrating the ingredient breakdown and composition for the cream cheese of FIG. 9;

FIG. 12 is a table illustrating the ingredient breakdown and composition for the cream cheese of FIG. 11;

FIG. 14 is a table illustrating the ingredient breakdown and composition for the cream cheese of FIG. 14.

Figure 1:
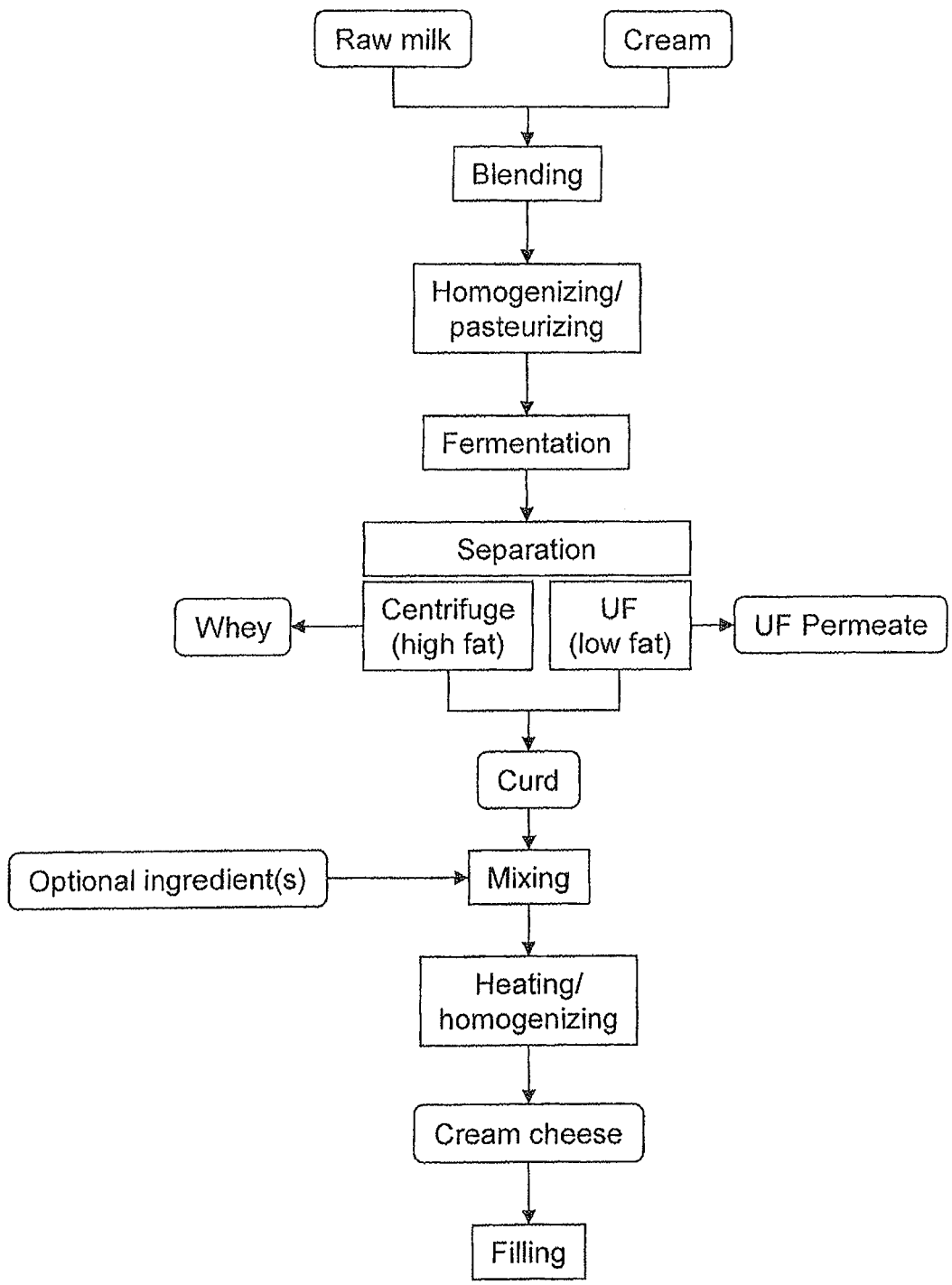
FIG. 1 is a flow diagram illustrating an embodiment of a conventional process for producing cream cheese from milk, i.e., raw milk or pasteurized whole milk and cream, including optional steps.
Figure 2:
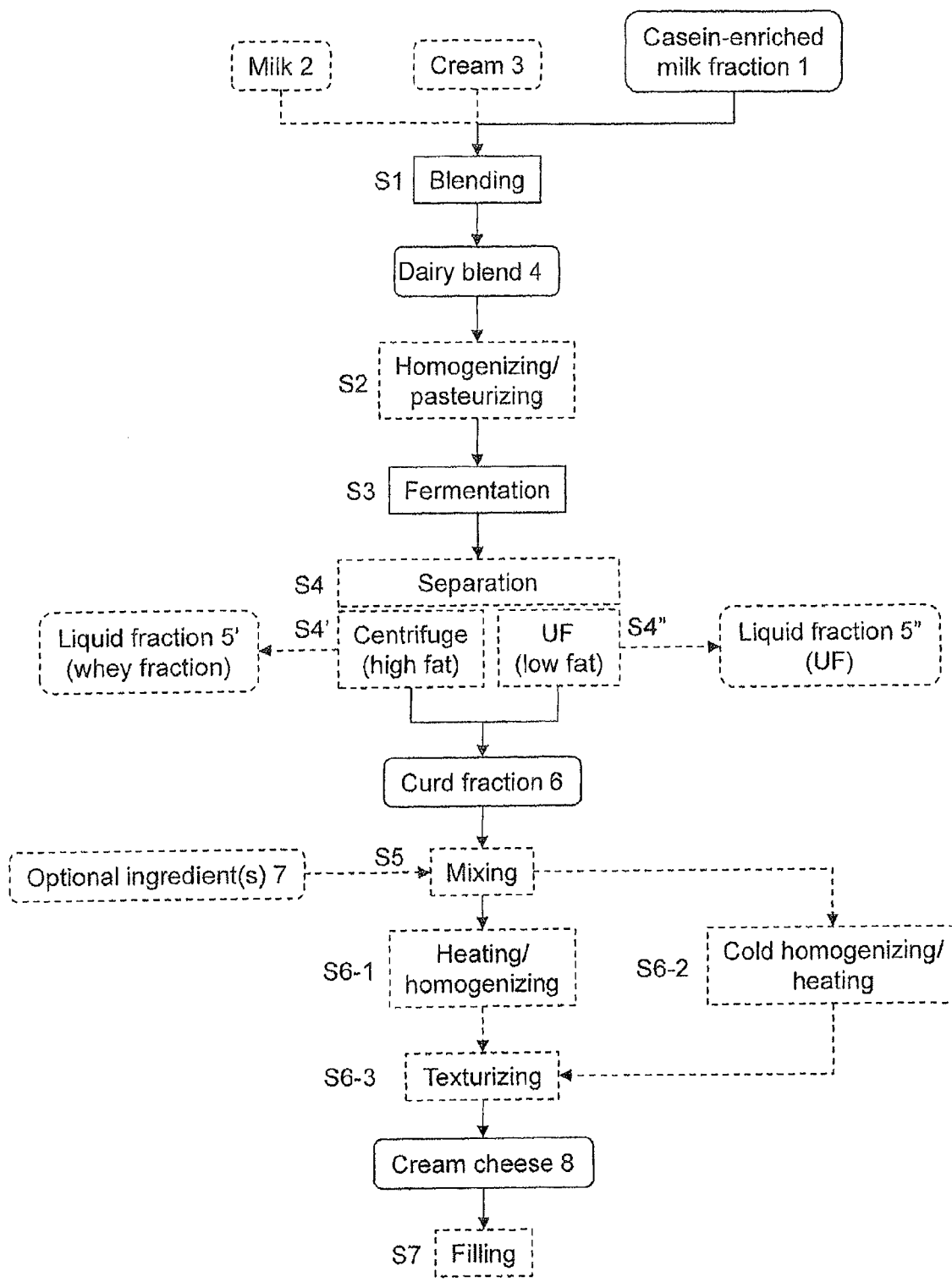
FIG. 2 is a flow diagram illustrating a general embodiment of the process of the present application for producing cream cheese, including optional steps.

In the Figures, products are shown in rounded boxes, whereas process steps are shown in rectangular boxes. Optional products and process steps are identified by dashed lines. In the figures and throughout the description and claims, products may additionally be identified by Arabic numerals, whereas process steps may additionally be identified by Arabic numerals preceded by the letter "S".

DETAILED DESCRIPTION

General Definitions and Conventions

In the present specification, it is intended that any disclosure of embodiments, or preferred, more preferred etc. embodiments, of features of the application also encompasses a disclosure of their combination. For example, the disclosure of a feature A, its preferred embodiment A' and its more preferred embodiment A" and the disclosure of a feature B, its preferred embodiment B' and its more preferred embodiment B" is intended to disclose as well, insofar as technically sensible, the combination of A+B, A+B', A+B", A'+B, A'+B" and A"+B". The further disclosure of a feature C, its preferred embodiment C' and its more preferred embodiment C" is intended to disclose as well, insofar as technically sensible, all conceivable combinations of C, C' and C" with the afore-mentioned features, embodiments and combinations of A, A', A", B, B' and B".

As used herein, the term "cream cheese" may be used to refer to any number of different cream cheese products and related cream cheese products. For example, such term may include not only standard cream cheese, but may also include Neufchatel and cream cheese spreads and cream cheeses with nutrient claims (reduced fat, light, low fat cream cheeses).

In various process steps of the present disclosure, dairy, milk or milk products are separated (fractionated) into fractions, and preferred separation (fractionation) means are centrifugation and membrane separation technologies. It should be understood that the terms "dairy" and "milk" may be used interchangeably to designate any number of different dairy and dairy derived materials. For example, such terms may include milk, skim milk, whole milk, raw milk, cream, concentrated milk fat, buttermilk, whey proteins with and without lactose concentrate, dairy mineral concentrate, dairy powders, membrane filtered retentate and the like.

Centrifugation will separate milk or milk products into fractions according to their specific gravity. For example, centrifugation can be used to separate solids or semi-solids such as curd from liquids such as whey. It can also be used to separate liquids of different specific gravity. For example, centrifugation can be used to fractionate milk into cream and skim milk. The application of centrifugation as a fractionation means for milk and dairy products is generally known in the art, as reflected by H.G. Kessler: Centrifugation—Separation—Cyclone Separation in "Food and Bio Process Engineering", Verlag A. Kessler, 5th ed., pages 41-54 (2002).

Membrane separation technologies include microfiltration (MF), ultrafiltration (UF), nanofiltration (NF) and reverse osmosis (RO), which will fractionate milk or milk products according to the particle size or molecular weight of their respective components, providing a depleted permeate (passing through the membrane) and an enriched retentate (not passing through the membrane). In general, microfiltration provides a retentate (MF retentate) which is enriched in substances having dimensions of more than about 0.05 µm (50 nm), including fat globules, casein (casein micelles) and bacteria. Particles or substances having smaller dimensions such as whey proteins, lactose, minerals (dissolved mineral salts) and water will be found in the permeate (MF permeate). Ultrafiltration provides a retentate (UF retentate) which is enriched in substances having dimensions of more than about 0.003 µm (3 nm) or alternatively a molecular weight of more than about 6 kDa, including whey proteins and the above-mentioned substances in the MF retentate. Particles or substances having smaller dimensions such as lactose, minerals and water will be found in the permeate (UF permeate). Nanofiltration provides a retentate (NF retentate) which is enriched in substances having dimensions of more than about 0.001 µm (1 nm) or alternatively a molecular weight of more than about 0.2 kDa, including lactose and the above-mentioned substances in the UF retentate. Particles or substances having smaller dimensions such as minerals and water will be found in the permeate (NF permeate). Finally, reverse osmosis provides pure water as the permeate, while enriching all other substances in the retentate (RO retentate). Types, pore sizes and fractionation characteristics of commercially available membranes are described, e.g., in H. G. Kessler: Membrane Separation-Processes in "Food and Bio Process Engineering", Verlag A. Kessler, 5th ed., pages 56-99 (2002); V.V. Mistry, J.-L. Maubois: Application of membrane separation technology to cheese production in "Cheese, Chemistry, Physics and Microbiology", Vol. 1, 3rd ed., edited by P. Fox, P. McSweeney, T. Cogan, T. Guinee, Elsevier Academic Press, pages 261-285 (2004); M. Cheryan: Handbuch Ultrafiltration, B. Behr's Verlag (1990); R. Rautenbach, R. Albrecht: Membrane Processes, John Wiley & Sons (1989).

For the purpose of this specification and the attached claims, the various membrane separation technologies can be defined and distinguished functionally in terms of their separation and enrichment characteristics as regards the relevant substances, namely fat globules and casein, whey proteins, lactose and minerals. Thus, for example, an "ultrafiltration step" or "ultrafiltration means" will be capable of providing a retentate which is enriched in fat globules, casein and/or whey proteins and a permeate which is enriched in lactose and/or minerals, depending on the composition of the substrate to be fractionated.

The extent of the enrichment can be described by means of the volumetric concentration factor (VCF), which reflects the ratio of the initial feed volume, excluding any diafiltration medium, to the retentate volume. For example, 3× MF milk would refer to the retentate of milk having been subjected to MF treatment and providing 1 part of retentate per 3 parts of initial feed (by volume).

In order to improve the removal of permeate components from the substrate to be fractionated, fresh solvent may be added to the feed to replace the permeate volume, at the same rate as the permeate flow rate, such that the volume in the system remains constant. Dilution and re-concentration is sometimes also referred to as "diafiltration". Likewise, it is possible and can be useful to make use of cross-flow filtration (also known as tangential flow filtration, TFF), rather than dead-end filtration (normal flow filtration, NFF). In cross-flow filtration, the substrate to be fractionated is pumped tangentially along the surface of the membrane. An applied pressure serves to force a portion of the substrate through the membrane to the permeate side. As in dead-end filtration, particulates and macromolecules that are too large to pass through the membrane pores are retained on the retentate side. However, in cross-flow filtration, the retained components ideally do not build up at the surface of the membrane. Instead, they are swept along by the tangential flow.

Unless indicated otherwise, percentages used in this application and in the attached claims are based on weight (w/w).

Process for Producing Cream Cheese

As generally shown in FIGS. 1 to 1, in one process for producing cream cheese in accordance with the present disclosure, a casein-enriched dairy/milk fraction 1, having at least about 6.5% casein and, in some approaches, about 6.5% to about 11.5% casein, is used in the preparation of a dairy blend 4, the dairy blend is subjected to fermentation S3, and cream cheese 8 is prepared from the fermented dairy blend.

The casein-enriched dairy/milk fraction is used to increase and adjust the casein concentration in the dairy blend. In one embodiment, the casein concentration in the dairy blend is adjusted to the range of from about 2.0 to about 3.1% w/w. In another form, the casein concentration is adjusted to a range of from about 0.4 to about 6.6. The fat content in the dairy blend will usually be adjusted depending on the desired fat content of the final cream cheese, e.g., a light or full fat product. Thus, the fat content in the dairy blend may be adjusted to a level of up to 30% w/w. In one form, the fat content may be in a range from about 1.4 to about 30. In another form, the fat content may be in a range of about 10% to about 30%. In yet another form, the fat content may be in a range of about 1.4% to about 10%.

Adjusted casein concentrations and fat contents refer to the respective levels at which the dairy blend is subjected to fermentation. Surprisingly, it has been found that adding the casein-enriched dairy/milk fraction to the dairy blend, followed by lactic acid bacteria fermentation and concentration of the fermented dairy blend, allows the manufacture of a cream cheese with varying fat levels and without detectable bitterness or flavor defects, and without a limitation on the protein level.

In one form, the casein-enriched dairy/milk fraction is preferably a skim milk MF retentate (produced by subjecting skim milk to microfiltration). For example, a 2× to 4× (VCF) MF skim milk retentate, preferably a 2.5× to 3.5× (VCF) MF skim milk retentate, and more preferably a 3× (VCF) MF skim milk retentate may be used. The proportion of the MF retentate in the milk blend is adjusted depending on the desired casein concentration in the milk blend and the VCF value of the MF retentate.

For adjusting the fat content of the dairy blend, it is preferable to use cream 3. However, it should be noted that other dairy materials may also be used. In one approach, the dairy blend is prepared and adjusted in terms of fat content and casein concentration by using in combination milk 2, cream 3 and the casein-enriched milk fraction 1, preferably a skim milk MF retentate. Inter alia depending on the desired fat content, the milk 2 can be raw milk, in particular pasteurized whole milk, or skim milk or other dairy materials as noted above. The present application also encompasses embodiments in which selected fat sub-fractions, as defined by their melting points, or a combination thereof are used.

In the fermentation step S3, a bacteria culture is added to inoculate the dairy blend. The fermentation can be carried out in conventional manner, for example at room temperature for at least about 10 hours and up to a maximum of between 1 to 2 days, and in some approaches, for a period of from about 15 to about 20 hours. In one aspect, suitable cultures may comprise a lactic starter culture, such as any lactic acid-producing bacteria used in conventional cream cheese making. Suitable lactic acid-producing bacteria include *Lactococcus* or *Leuconostoc* such as *Lactococcus lactis, Lactococcus cremoris, Lactotococcus lactis*, spp. *diacetyllactis, Leuconostoc cremoris*, and the like. Furthermore, it is also possible to use exopolysaccharide-producing cultures. However, it is preferred to use a lactic starter culture selected from the group consisting of mesophilic and thermophilic lactic acid-producing bacteria, more preferably mesophilic bacteria. A single type of lactic acid-producing bacteria or a combination of two or more thereof can be used. During fermentation, the pH of the dairy blend will typically decrease, and it may be desirable to adjust the pH of the fermented dairy blend after the fermentation, preferably to the range of from about 4.4 to about 5.2. This may be achieved by the addition of a pH modifying agent, including acids and preferably unfermented milk blend.

The process steps of preparing the dairy blend and subjecting it to fermentation may be preceded, interrupted or followed by one or more additional optional process steps. In particular, such additional process steps may be process steps which are conventionally used in the manufacture of cream cheese, and they include any step or combination of steps necessary for preparing cream cheese from the fermented milk blend.

In particular, prior to fermentation, the dairy blend may be homogenized and pasteurized (heat treated), as is conventional in this field. Homogenization can be carried out prior to or after the heat treatment. The heat treatment is may be conducted such that the whey protein in the milk blend is partially or fully denatured.

After the fermentation step and an optional pH adjustment step, the resulting fermented dairy blend is traditionally separated into a (semi-solid) curd fraction 6 and a liquid fraction 5', 5". The separation 54 may be achieved by centrifugation S4' or ultrafiltration S4". In some approaches, it may be necessary for the fermented dairy blend to have a certain minimum fat content to be separable by centrifugation. For example, the minimum fat content of the dairy blend suitable for centrifugation may be about 6.5%. The centrifugation can be carried out at the conventional temperatures used in the separation of fermented dairy blend into curd and whey. The resulting liquid fraction 5' may also be termed whey fraction, namely containing whey proteins, lactose, minerals and, compared to the conventional process, a reduced proportion of fat. Surprisingly, the whey fraction resulting from the centrifugal separator contains only little fat and a considerably reduced level of proteins, as compared to the whey in a conventional cream cheese manufacturing process without addition of a casein-enriched milk fraction. For example, the liquid or whey fraction from centrifugation of the dairy blends herein may include about 0.03% to about 0.05% fat and/or about 0.25% to about 0.35% protein.

The separation may also be carried out by ultrafiltration S4", in either cold or hot conditions. Hot conditions can include a temperature of above about 50° C., whereas cold conditions are those below about 20° C. Separation by means of UF treatment provides a liquid fraction 5" as the permeate which is enriched in lactose and minerals, whereas the major portion of fat and whey proteins, together with casein, is retained in the curd fraction 6. For example, the liquid fraction from ultrafiltration of the dairy blends herein may contain about 3% to about 5% lactose and/or about 0.77% to about 0.85% minerals.

In one embodiment of the process for preparing cream cheese in accordance with the present application, it has been found that it may not be necessary to separate the fermented dairy blend. In this regard, the fermented dairy blend is prepared as described above, at a higher enrichment in casein and fat content, such as about 3% to about 6.6% casein and about 11% to about 26% fat, so that no separation is necessary. The separation step S4 is omitted and the fermented dairy blend takes the place of the curd fraction and is processed accordingly as further described below. In this embodiment, the use of exopolysaccharide-producing cultures in the fermentation step may be advantageous.

The curd fraction may be supplemented and blended with one or more further cream cheese ingredients (optional ingredient(s) 7), each of which may be liquid or solid (e.g., powdery). When both types of optional ingredients are used, it is preferable that the liquid components be added to and mixed with the curd fraction before adding and blending in the solid or powdery components. In the embodiment where the separation of the fermented milk blend is omitted, the optional ingredients may also be added prior to the fermentation step.

Exemplary liquid components are liquid dairy components such as cream, sour cream, whey protein concentrate (in one approach functionalized) and unfermented milk blend, mineral concentrate, lactose concentrate and other dairy materials. Cream and sour cream or a mixture thereof can be used to adjust the fat content of the curd fraction and, thus, of the final cream cheese. In addition, sour cream can be used to adjust the acidity of the curd fraction and final cream cheese (the addition of cream and/or sour cream also forms part of the third supplement to the process of the present application, as described further below). Functionalized whey protein concentrate is known in this field, e.g., as described in EP 1 249 176 and EP 1 698 231, both of which are incorporated herein by reference. It is usually available and prepared in the form of an aqueous suspension and can be added to the curd fraction to improve smoothness and mouthfeel, without increasing the fat content in the final cream cheese. Unfermented milk blend may be added to adjust the pH and sweetness of the resulting cream cheese.

Exemplary powders include stabilizers, salt, pH modifying agents, flavor additives, colorants, fruits, nuts and the like. Stabilizers include locust bean gum, carrageenan, xanthan gum, guar gum, methyl cellulose, hydroxypropylmethyl cellulose, etc. Flavor additives include butter flavor, milk flavor, cheese flavor and the like, spices and condiments such as pepper, chives, garlic, scallions and the like. Colorants include β-carotene, annatto and the like. Furthermore, for sweetening purposes, mono- and oligosaccharides such as sucrose, glucose, fructose and maltose, sugar alcohols such as sorbitol, maltitol and lactitol and low-calorie sweeteners such as saccharin, aspartame, stevioside and thaumatin may be added.

After addition of liquid and/or solid components, the resulting mixture is usually homogenized. Homogenization S6-1, S6-2 can be carried in the hot (S6-1) or cold state (S6-2), i.e., with or without prior heating. When the mixture is cold homogenized (S6-2), it is subsequently heated, e.g., by SSHE (scraped surface heat exchange) treatment. The homogenization is preferably followed by a texturizing step S6-3 such as by subjecting the mixture to heating and shearing, for example at a temperature in the range of from 65 to 90° C. The resulting cream cheese 8 can be filled into tubs or plastic containers or any other suitable packaging means. Typically, the homogenized cream cheese is hot-filled into a container, sealed and cooled.

A particularly preferred embodiment of the present application comprises the process for producing cream cheese as described above and further includes the addition of whey protein concentrate (preferably functionalized and obtainable by the first supplement to the process, as described below) and optionally lactose to the curd fraction and a texturizing step after the addition of optional ingredients to the curd and homogenization.

First Supplement to the Process for Producing Cream Cheese

Figure 3:
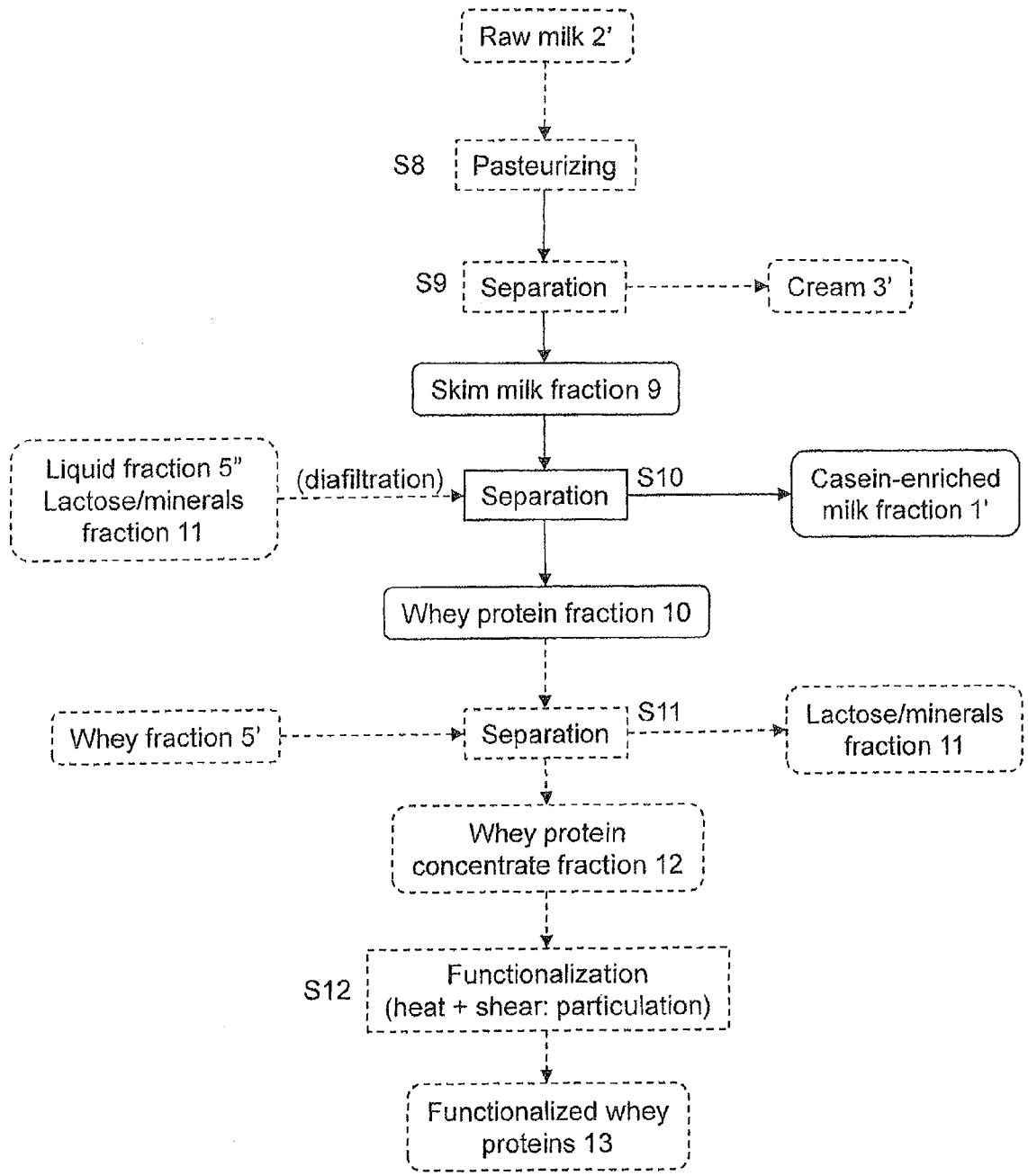
FIG. 3 is a flow diagram illustrating a general embodiment of a first supplement to the process of the present application which produces the casein-enriched milk fraction and the whey protein fraction, including optional steps.

As shown in FIG. 3, in the first supplement to the process, skim milk is separated to produce, on the one hand, a casein-enriched milk fraction 1' which can be used for preparing the dairy blend 4 in the process and, on the other hand, a whey protein fraction 10 which is enriched in whey proteins. In one form, the casein-enriched milk fraction 1' includes at least about 6.5% casein (in other approaches, about 6.5% to about 11.5% casein) and the whey protein fraction 10 includes at least about 0.4% whey protein (in other approaches, about 0.4% to about 0.7% whey protein). In one approach, the separation S10 is carried out by means of microfiltration, producing the casein-enriched milk fraction 1' as the retentate and the whey protein fraction 10 as the permeate. In another embodiment, a 2× to 4× (VCF) MF skim milk retentate is produced, in other approaches a 2.5× to 3.5× MF skim milk retentate, even in yet other approaches a 3× MF skim milk retentate.

The skim milk which is used in the first process supplement can be obtained from raw milk or preferably pasteurized whole milk, which can be subjected to microfiltration or centrifugation S9 to produce cream 3' as a retentate and a skim milk fraction 9 as a permeate.

In one embodiment, the whey protein fraction 10 is separated into a whey protein concentrate fraction 12 and a lactose/minerals fraction 11, such as by means of ultrafiltration S11 (FIG. 3). The whey fraction 5', which may be produced as a liquid by-product in the process, namely by centrifuging the fermented dairy blend, can be treated, i.e., separated, in like manner. In such case, the whey fraction 5' and the whey protein fraction 10 are combined, and the combined fractions are separated in a combined process step. Apart from the whey protein fraction 10 and the whey fraction 5', it is also possible to use whey from independent sources and subject it to the separation step S11.

The separation of the whey protein fraction 10, optionally in combination with the whey fraction 5', provides a whey protein concentrate fraction 12 as a retentate and a lactose/minerals fraction 11 as a permeate. (FIG. 3.) The whey protein concentrate fraction 12 may be used, i.e., reintroduced, as one of the optional ingredients 7 to be added to the curd fraction 6 which is obtained after fermentation of the dairy blend 4 and separation of the fermented dairy blend (see FIG. 4). The permeate 11 resulting from the ultrafiltration step S11 can also be used for diafiltration of the skim milk fraction 9 in the separation step S10.

Figure 6:
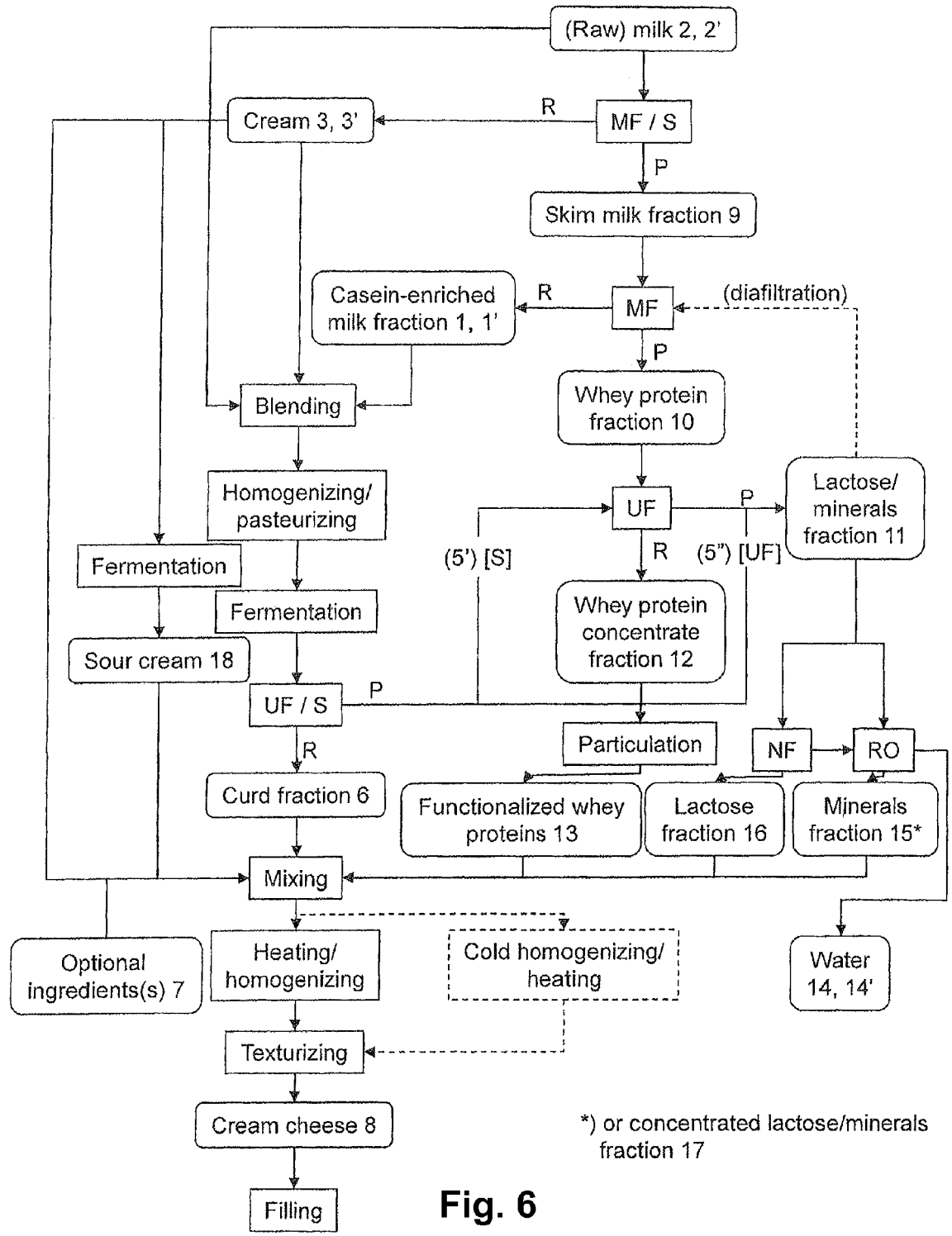
FIG. 6 is a flow diagram illustrating a general embodiment of the process of the present application including the first to third supplements and including optional steps.

In one embodiment, the whey protein concentrate fraction 12 is further subjected to a so-called particulation (or microparticulation) treatment S12 as known in the art (see, e.g., EP 1 698 231). The thus obtained particulated (functionalized) whey proteins 13 imitate the mouthfeel of added fat, yet without the fat content. As a result, the functionalized whey proteins are preferably used as one of the optional ingredients 7 to be added to the curd fraction 6. (FIG. 6.)

When reintroduced into the cream cheese production process, the whey protein concentrate fraction 72, as such or after particulation as described above, may be added at a level of about 5 to about 40% w/w, calculated as whey proteins and based on the final cream cheese. Especially in those embodiments without a separation of the fermented dairy blend, the whey protein concentrate fraction may also be used, i.e., reintroduced, as an optional ingredient in the preparation of the dairy blend, prior to the fermentation step.

The present application also encompasses embodiments in which the whey proteins, as found in the whey protein fraction 10 or whey protein concentrate fraction 12, are further fractionated into their constituent protein types, e.g., beta-lactoglobulin, alpha-lactalbumin and serum albumin, and wherein selected protein types or a combination thereof are further processed and reintroduced into the cream cheese production process.

Second Supplement to the Process for Producing Cream Cheese

Figure 4:
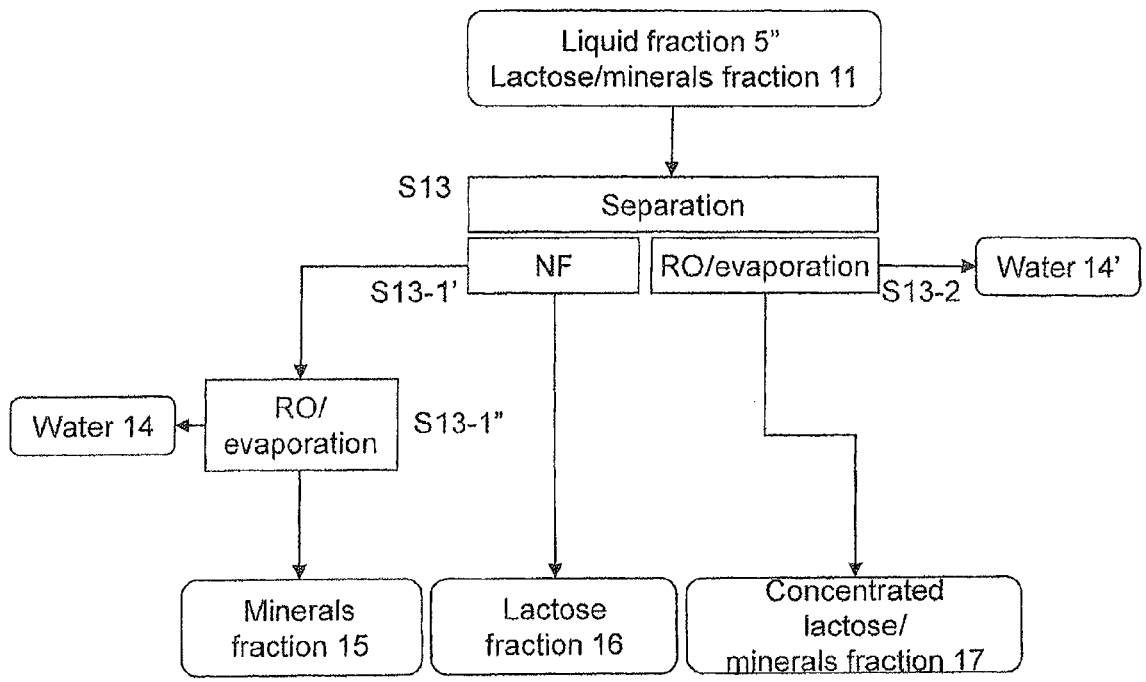
FIG. 4 is a flow diagram illustrating a general embodiment of the second supplement to the process of the present application which produces the minerals fraction, lactose fraction and/or concentrated minerals/lactose fraction.
Figure 5:
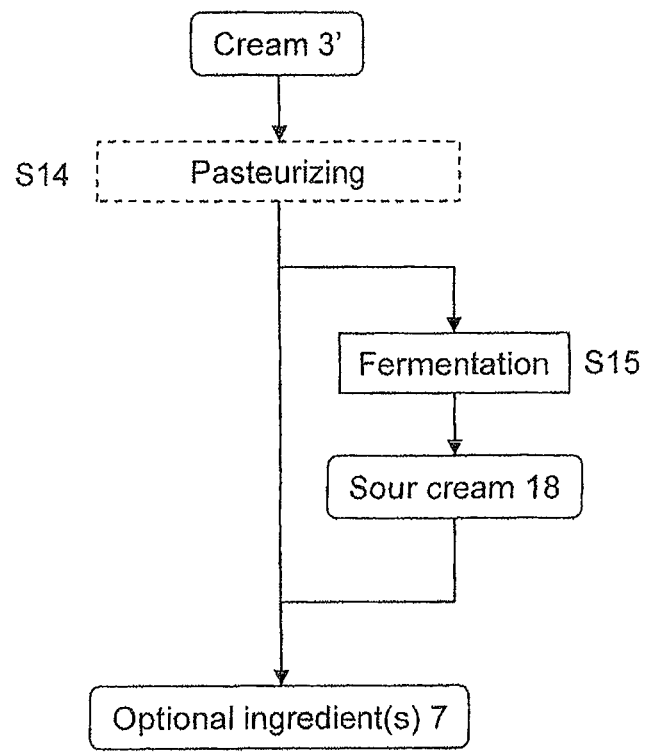
FIG. 5 is a flow diagram illustrating a general embodiment of the third supplement to the process of the present application which adds cream, sour cream or a mixture thereof as cream cheese ingredients, including optional steps.

In the second supplement to the process of the application, the lactose/minerals fraction 11 obtained in the first process supplement can be further separated into a lactose fraction 16 and a minerals fraction 15, or concentrated into a concentrated lactose/minerals fraction 17 as generally shown in FIG. 4. In one form, the lactose fraction 16 may have about 14% lactose at 18% solids and the minerals fraction 15 may have about 9% minerals at 18% solids.

For separating the lactose/minerals fraction into a lactose fraction and a minerals fraction, one approach may apply a sequence of nanofiltration S13-1' and concentration S13-1", such as by means of reverse osmosis. In the nanofiltration step, the lactose/minerals fraction is separated into a lactose-enriched retentate (lactose fraction 16) and a minerals-enriched permeate. The minerals-enriched permeate can be further concentrated, for example by means of reverse osmosis or evaporation of water, to provide a minerals fraction 15. (FIG. 4.) One or both of the lactose fraction 16 and the minerals fraction 15 or part thereof may be added, i.e., reintroduced, as a liquid or powdery component to the curd fraction 6 (or fermented dairy blend in the embodiment forgoing separation of the fermented dairy blend). (See FIG. 6.) Especially in those embodiments without a separation of the fermented dairy blend, the lactose and minerals fractions 16 and 15, respectively, may also be used, i.e., reintroduced, as an optional ingredient in the preparation of the dairy blend, prior to the fermentation step.

For concentrating the lactose/minerals fraction in a separation step S13-2, it can be subjected to reverse osmosis or concentrated by means of evaporation as known to those skilled in the art, thus providing a concentrated lactose/minerals fraction 17 (FIG. 4), which may be added, i.e., reintroduced, to the curd fraction obtained after fermentation of the dairy blend 4 and separation of the fermented dairy blend 4. Especially in those embodiments without a separation of the fermented dairy blend, the concentrated lactose/minerals fraction may also be used, i.e., reintroduced, as an optional ingredient in the preparation of the dairy blend 4, prior to the fermentation step S3.

When reintroduced into the cream cheese production process, the lactose, minerals and/or concentrated lactose/minerals fractions may be added at amounts so as to increase the level of lactose in the final cream cheese by 0.5 to 4 percentage points and/or to increase the level of minerals in the final cream cheese by 0.1 to 1 percentage points. For example, the level of lactose in the final cream cheese after adding fractions 15, 16, and/or 17, may be about 3.5% to about 7% lactose.

The second supplement to the process of the application may be applied in like manner to the liquid fraction 5″ of the process described herein, provided it is obtained by ultrafiltration. In this embodiment, the second process supplement may be applied to the liquid fraction 5″ separately, or it may be applied to the combined lactose/minerals fraction 11 and liquid fraction 5″. Alternatively, the separation into a lactose fraction and a minerals fraction according to the second process supplement may be applied to one of the lactose/minerals fraction 11 and the liquid fraction 5″, and the concentration into a concentrated lactose/minerals fraction may be applied to the respective other fraction.

The present application also encompasses embodiments in which the lactose, as found in the lactose/minerals fraction 11 or lactose fraction 16, are modified, for example to produce galactose, lactulose, galactooligosaccharides, lactobionic acid, lactose esters and the like. Such modified lactose may be further processed and reintroduced into the cream cheese production process for modifying the organoleptic properties of the cream cheese product. However, it will not account for the lactose level in the cream cheese product.

Third Supplement to the Process for Producing Cream Cheese

Turning to FIG. 3, in a third supplement to the process, cream 3' obtained from raw milk 2', optionally after pasteurization S14, can be added to the curd fraction 6 (or fermented dairy blend in the embodiment forgoing separation of the fermented dairy blend) as one of the optional ingredients 7. In one form, the cream 3' may include about 35% to about 70% fat. By addition of the cream, the fat content of the final cream cheese can be standardized, and different flavor notes can be generated. In another approach, the cream is obtained in the first process supplement as described above. Prior to addition to the curd fraction, the cream can be fully or partially fermented in a fermentation step S15, thus producing sour cream 18. This will provide a further option to modify and improve the flavor of the final cream cheese. Cream and sour cream may also be added in combination, either separately or as a pre-blended mixture. Cream and/or sour cream may be added so as to achieve the desired final fat content, i.e., up to 30% w/w, in the final cream cheese (which may be a non-fat, low fat, full fat, etc. cream cheese).

Cream Cheese

The cream cheese of the present application is characterized by having a unique composition in terms of the levels of mineral, especially calcium (Ca), phosphorus (P) and potassium (K), lactose and protein (casein and whey protein). In particular, the cream cheese is characterized by the following properties:

a (Ca+P)/casein weight ratio of about ≥0.05
a whey protein/true protein weight ratio of ≥about 25.0%
a K content of ≥about 140 mg/100 g and
a lactose content of ≥about 3.5 g/100 g.

In another approach, the cream cheese is characterized by the following properties:

a (Ca+P)/casein weight ratio in the range of from about 0.05 to about 0.20
a whey protein/true protein weight ratio in the range of from about 25.0% to about 60.0%
a K content in the range of from about 140 to about 350 mg/100 g and
a lactose content in the range of from about 3.5 to about 12 g/100 g.

Generally, the cream cheese as defined above is obtainable by the process of the present application. In one embodiment, the present application also extends to the cream cheese obtained by the process of the present application.

The contents of Ca, P, K, lactose, casein, whey protein and true protein in cream cheese are determined as follows:

Ca, P, K: DIN EN ISO 11885, mod (#1)
Lactose: enzymatic (VDLUFA Methodenbuch, Band VI, Milch, C 20.2.3)
Proteins (total): Kjeldahl method, IDF standard 25:1964
Non-protein nitrogen (NPN): Kjeldahl, Amtliche Sammlung von Untersuchungsverfahren nach § 64 LFGB (ASU), L 01.11-10/4
Casein and whey proteins: ASU L 01.11-40
True protein: (total protein nitrogen - NPN)×6.38

Without wishing to be bound by theory, it is contemplated that the (Ca+P)/casein ratio in the cream cheese described herein is directly correlated with the use of a casein-enriched milk fraction 1, 1' in the preparation of the dairy blend 4, as a large amount of both Ca and P is bound to the casein in colloidal form. The high whey protein/true protein ratio can be accomplished by adding whey protein or (optionally functionalized) whey protein concentrate in the course of the cream cheese manufacture, e.g., by adding it to the curd fraction 6 (or fermented dairy blend in the embodiment forgoing separation of the fermented dairy blend).

In one form, the cream cheese is manufactured using starting dairy materials which are combined with casein-enriched materials. For example, the casein-enriched material may have at least 6.5% casein while the starting dairy materials have between about 1.2% and 26% fat and between about 0.15% and 2.9% protein. Additional materials, including recycled materials and by-products from the processing of the cream cheese may be added back in to produce the cream cheese. In one form, the resulting cream cheese includes about 3% to about 21% fat, about 5% to about 12% protein, about 3.5 to about 7% lactose, about 2.35% to about 6.65% casein, about 1.95% to about 5.6% whey, a total solids content of about 23 to about 33, and a protein to fat ratio of about 0.25 to about 3.8.

Process for Preparing a Food Product

The process for producing cream cheese in accordance with the present application may be extended to a process for preparing a food product comprising cream cheese and one or more additional food product components. This process comprises the steps of producing cream in accordance with the process as defined above and combining the cream cheese thus produced with the one or more additional food product components. The one or more additional food product components include, by way of example, a confectionery product and a bakery product. The step of combining the cream cheese and the one or more additional food product components may be exemplified by any one of a filling step, a coating step and a layering step. For example, the cream cheese may be filled into another food product component by injection, e.g., injected into a confectionery product or a bakery product; or the cream cheese may be coated on another food product component and, after coating, may optionally be covered by yet another food product component; or the cream cheese may be coextruded with one or more additional food product components, thus forming a layered food product.

The present application is further illustrated by the following examples.

EXAMPLES

Example 1

Retention of Fat and Protein in the Curd

Raw milk, cream and 3× MF retentate obtained by microfiltration of skim milk were blended to produce a trial feed (milk blend) having a composition in terms of total solids, fat and protein (whey proteins and casein) as shown in the table below. The trial feed was heat treated and subjected to lactic acid bacteria fermentation. The fermented mix was separated into whey and curd using a centrifuge.

For comparison purposes, a standard feed was produced without addition of the 3× MF retentate and processed as above.

The compositions of the whey streams obtained from the trial feed and standard feed were analyzed and are shown in the following table (in % w/w):

|  | Trial feed | Standard feed | Trial whey | Standard whey |
|---|---|---|---|---|
| Total Solids | 22.50% | 21.1% | 5.91% | 6.58% |
| Fat | 14.50% | 13.2% | <0.03% | 0.08% |
| Protein | 3.64% | 3.2% | 0.38% | 0.63% |

As a result, it is evident that the whey stream obtained from the trial feed with added casein-enriched milk fraction is practically free of fat and has a content of protein which is reduced by 60-70% as compared to the standard whey.

Example 2

Retention of Fat and Protein in the Curd

Example 1 was repeated and scaled-up in the plant for showing the reproducibility of the effect of adding casein-enriched milk fraction to the milk blend (feed stream). The results are shown in the following table:

|  | Trial feed | Standard feed | Trial whey | Standard whey |
|---|---|---|---|---|
| Total Solids | 23.8% | 26.6% | 5.97% | 7.05% |
| Fat | 16.0% | 18.75% | 0.04% | 0.2% |
| Protein | 3.48% | 2.87% | 0.31% | 0.8% |

It is thus evident that the effect of the present application is reproducible.

Example 3

Manufacture of Cream Cheese from Standardized Milk Enriched with 3× MF Skim Milk Concentrate and Ultrafiltration Separation Technology Skim milk was concentrated by means of microfiltration to obtain a retentate with a 3× VCF and containing ca. 8.6% total protein, ca. 0.22% fat, ca. 4.2% lactose and ca. 14.6% total solids. This concentrate was added to a blend of 34.1% of whole milk and 65.9% of ca. 37% fat cream. The resulting milk blend was cultured in accordance with ordinary practice in this field. When a pH of <4.6 was reached, the fermented milk blend was separated into a curd fraction and a whey fraction using conventional ultrafiltration equipment.

Subsequently, the resulting UF curd was mixed with a microparticulated UF whey protein concentrate (WPC), an RO lactose concentrate and sour cream to obtain a cream cheese having a final calculated composition of 36% solids, 24% fat, 5.3% protein, 5.2% lactose and 0.8% salt. The actual analytical results for the composition of the cream cheese are shown in the following table:

| Component | Proportion (w/w) |
|---|---|
| Solids content | 36.4% |
| Fat | 24.8% |
| Protein | 4.9% |
| Lactose | 4.3% |
| NaCl (salt) | 0.79% |

Based on the fat and protein contents, the cream cheese had a protein/fat ratio of 0.20. Sensory evaluation of the cream cheese revealed a firm, desirable appearance with a full buttery body.

Example 4

Manufacture of Cream Cheese from Standardized Milk Enriched with 3× MF Skim Milk Concentrate and Centrifugal Separation Technology Skim milk was concentrated by means of microfiltration to obtain a retentate with a 3× VCF and containing ca. 8.6% total protein, ca. 0.22% fat, ca. 4.2% lactose and ca. 14.6% total solids. This concentrate was added to a blend of 34.1% of whole milk and 65.9% of ca. 37% fat cream. The resulting milk blend was cultured in accordance with ordinary practice in this field. When a pH of <4.6 was reached, the fermented milk blend was separated into a curd fraction and a whey fraction using a conventional centrifuge (separator).

Subsequently, the resulting separator curd was mixed with a microparticulated UF whey protein concentrate (WPC), an RO lactose concentrate and sour cream to obtain a cream cheese having a final calculated composition of 36% solids, 24% fat, 5.3% protein, 5.2% lactose and 0.8% salt. The actual analytical results for the composition of the cream cheese are shown in the following table:

| Component | Proportion (w/w) |
|---|---|
| Solids content | 36.2% |
| Fat | 24.8% |

-continued

| Component | Proportion (w/w) |
|---|---|
| Protein | 4.8% |
| Lactose | 4.3% |
| NaCl (salt) | 0.8% |

Based on the fat and protein contents, the cream cheese had a protein/fat ratio of 0.19. Sensory evaluation of the cream cheese revealed a firm, desirable appearance with a full buttery body.

Example 5

Manufacture of Cream Cheese from Standardized Milk Enriched with 3× MF Skim Milk Concentrate without Separation of Acid Whey Skim milk was concentrated by means of microfiltration to obtain a retentate with a 3× VCF and containing ca. 8.7% total protein, ca. 0.2% fat, ca. 4.1% lactose and ca. 14.8% total solids. 25% of this concentrate was added to 7.0% of whole milk and 68.0% of 40% fat cream. The resulting milk blend had the following composition:

| Component | Proportion (w/w) |
|---|---|
| Solids | 35.9% |
| Fat | 28.5% |
| Total Protein | 3.7% |
| Casein | 3.1% |

The milk blend was heated, homogenized and cultured in accordance with ordinary practice in this field. When a pH of 4.6 was reached, microparticulated UF WPC (15%) and salt were added. No further concentration or separation step was applied. The final blend was homogenized, heated and held under stirring at approximately 75-80° C. The actual analytical results for the composition of the final cream cheese are shown in the following table:

| Component | Proportion (w/w) |
|---|---|
| Solids | 34.2% |
| Fat | 24.2% |
| Total Protein | 5.0% |
| Casein | 2.6% |
| NaCl (salt) | 0.77% |

Sensory evaluation of the cream cheese revealed a smooth and creamy texture and a pleasant dairy-cultured, sour flavor.

Example 6

Manufacture of Cream Cheese from Standardized Milk Enriched with 3× MF Skim Milk Concentrate and UF Technology Skim milk was concentrated by means of microfiltration to obtain a retentate with a 3× VCF and containing ca. 8.6% total protein, ca. 0.22% fat, ca. 4.2% lactose and ca. 14.6% total solids. This concentrate was added to a blend of whole milk (83.75%) and cream containing ca. 30% fat (16.25%). The resulting milk blend was cultured in accordance with ordinary practice in this field. When a pH of <4.6 was reached, the fermented milk blend was separated into a curd fraction and a whey fraction using a UF unit.

Subsequently, the resulting UF curd was mixed with a microparticulated UF whey protein concentrate (WPC) and an RO lactose concentrate to obtain a cream cheese having a final calculated composition of 26.3% solids, 10% fat, 8.15% protein, 5.0% lactose and 0.75% salt. The actual analytical results for the composition of the cream cheese are shown in the following table:

| Component | Proportion (w/w) |
|---|---|
| Solids content | 36.4% |
| Fat | 24.8% |
| Protein | 4.9% |
| Lactose | 4.3% |
| NaCl (salt) | 0.79% |

Based on the fat and protein contents, the cream cheese had a protein/fat ratio of 0.795. Sensory evaluation of the cream cheese revealed a firm, desirable appearance with a smooth and creamy body.

Example 7

Sensory Test

The following cream cheese products were subjected to a sensory evaluation with a test panel of 150 untrained consumers and in a blinded fashion (coded products):

| No. | Product |
|---|---|
| 1 | MF - Separator - 20% total fat |
| 2 | MF - Separator - 22% total fat |
| 3 | MF - Separator - 24% total fat |
| 4 | MF - UF - 20% total fat |
| 5 | MF - UF - 22% total fat |
| 6 | MF - UF - 24% total fat |
| 7 | Applicant's current commercial product (standard plant) - 24% total fat |
| 8 | Applicant's current commercial product (pilot plant) - 24% total fat |

MF: 3X MF casein-enriched milk fraction

All products were tested in balanced rotating order, one at a time. One scoop of each product was tested by each consumer, and the consumers evaluated all products. The samples were first evaluated in pure fashion and then on bread (white or dark bread, the same for all samples of one consumer). After the consumption of each product, consumers were asked for overall liking, mouthfeel liking and creaminess, each on a 9 point liking scale.

The products were judged as follows:

| No. | Overall | No. | Mouthfeel | No. | Creaminess |
|---|---|---|---|---|---|
| 6 | 6.91 | 2 | 7.09 | 2 | 6.79 |
| 2 | 6.79 | 4 | 6.96 | 4 | 6.76 |
| 5 | 6.77 | 6 | 6.92 | 6 | 6.69 |
| 3 | 6.71 | 5 | 6.84 | 3 | 6.63 |
| 4 | 6.68 | 1 | 6.80 | 5 | 6.57 |
| 1 | 6.68 | 3 | 6.69 | 1 | 6.47 |
| 7 | 6.60 | 7 | 6.65 | 8 | 6.29 |
| 8 | 6.22 | 8 | 6.45 | 7 | 6.25 |
| 6 | 6.91 | 2 | 7.09 | 2 | 6.79 |

In the sensory evaluation, all products in accordance with the present application performed significantly better in the overall liking than the Applicant's commercial product (pilot plant). The UF-separated product with a total fat content of 24% performed best. The separator (centrifuge) product of the present disclosure with a total fat content of 22% performed best in the mouthfeel evaluation, and all products of the present disclosure outperformed the current commercial products. They also performed better in the evaluation of creaminess as compared to the commercial products.

Example 8

Analytical Properties

Cream cheese obtained by carrying out the process of the present application and separating the fermented milk blend by either separator (centrifuge) or UF was analyzed for its level of Ca, P, K, lactose, casein, whey protein and true protein in accordance with the methods identified in the specification above. In like manner, a commercially available cream cheese of the applicant and two competing products were analyzed. Finally, analytical data for a conventional product was retrieved from literature sources. The results are summarized in the following table:

| Substance (g/100 g) | MF – S | MF – UF | Applicant (comm.) | Comp. 1 | Comp. 2 | Lit.[1] |
|---|---|---|---|---|---|---|
| Total solids | 36.2 | 36.4 | 34.8 | 34.55 | 34.3 | 44.84 |
| Fat | 24.8 | 24.8 | 24.5 | 25.35 | 25.45 | 32.6 |
| Total protein | 4.85 | 4.95 | 5.27 | 4.70 | 4.84 | 6.31 |
| NPN[2] as protein | 0.43 | 0.48 | 0.24 | 0.19 | 0.19 | 0.28 |
| True protein[3] | 4.42 | 4.47 | 5.03 | 4.51 | 4.65 | 6.03 |
| Whey protein incl. NPN | 1.70 | 1.70 | 1.00 | 1.15 | 1.19 | 1.16 |
| Casein | 3.15 | 3.25 | 4.27 | 3.55 | 3.65 | 5.15 |
| Calcium | 0.118 | 0.116 | 0.0944 | 0.075 | 0.0796 | 0.0866 |
| Phosphor | 0.106 | 0.105 | 0.0986 | 0.097[4] | 0.097[4] | 0.0961 |
| Potassium | 0.187 | 0.182 | 0.123 | 0.088 | 0.099 | n.d. |
| Lactose | 4.25 | 4.31 | 2.80 | 2.40 | 2.55 | n.d. |

[1]Almena & Kindstedt, Austr. J. Dairy Technol. 60(3): 225-230(2005)
[2]Non-protein nitrogen
[3]True protein = total protein – NPN
[4]estimated, calculated as average of Applicant's commercial product and literature product

| Ratio (%) | MF – S | MF – UF | Applicant (comm.) | Comp. 1 | Comp. 2 | Lit. |
|---|---|---|---|---|---|---|
| Whey protein/true protein | 28.8 | 27.3 | 15.2 | 21.3 | 21.4 | 14.6 |
| (Ca + P)/casein | 7.1 | 6.8 | 4.5 | 4.8 | 4.8 | 3.5 |

Example 9

Manufacture of Cream Cheese with Approximately 20% Fat

Figure 7:
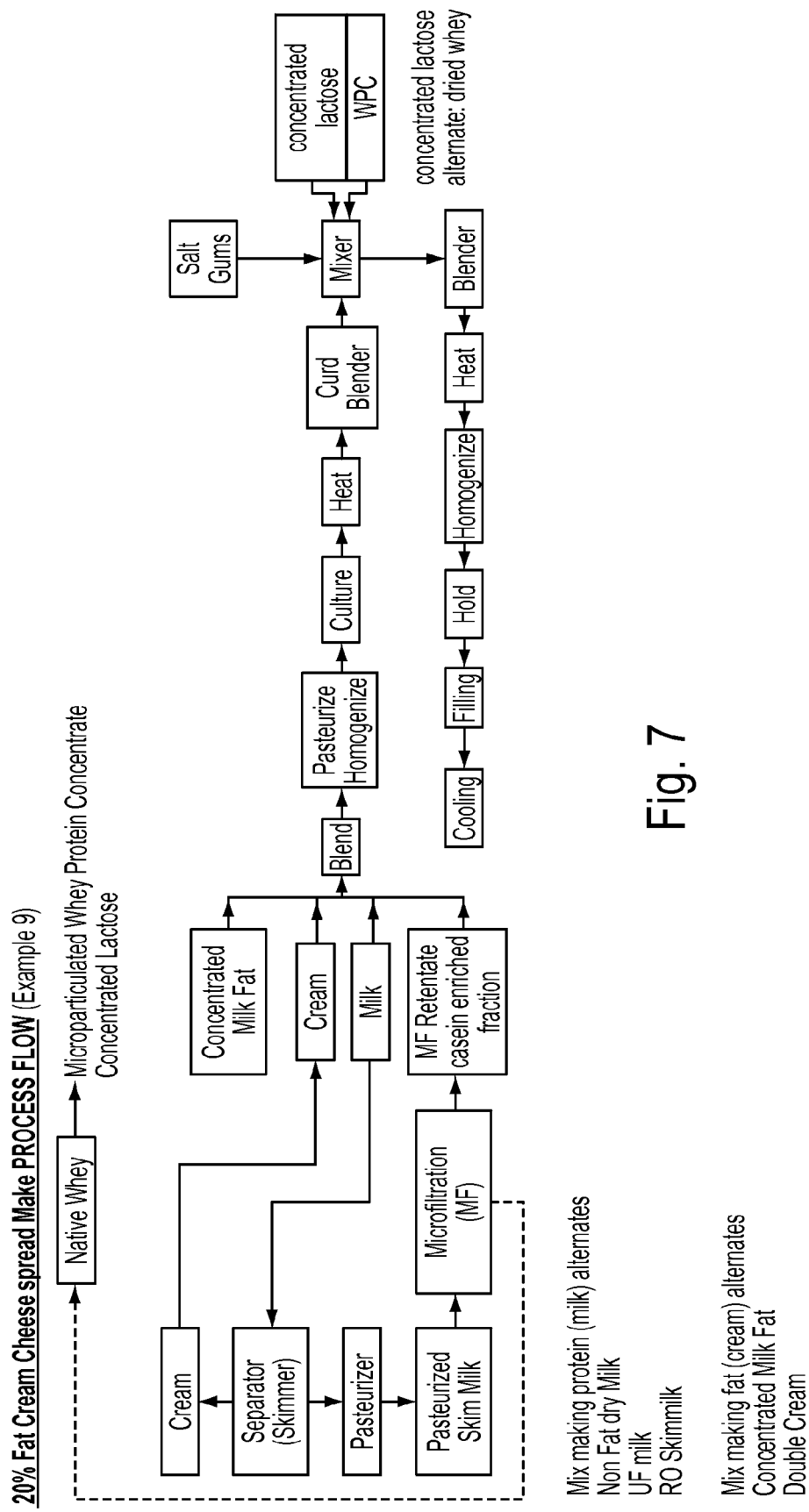
FIG. 7 is a flow diagram illustrating processing steps for one process for producing cream cheese.

Processing steps and compositional breakdown for the cream cheese in Example 9 are found in FIGS. 7 and 8. In Example 9, raw milk and Concentrated Milk Fat are combined with cream, which is recycled from further upstream in the process, along with microfiltered retentate as a casein-enriched fraction to produce an initial starting dairy mix. This mix is then pre-heated to 60° C., homogenized in a two stage homogenizer at 124/35 bars, pasteurized at 82° C. for 20 sec and cooled to a culturing temperature of 21° C. The blend is then cultured overnight to a pH of 4.6. The cultured mix is then heated to 64° C. and combined with microparticulated whey protein concentrate and evaporated lactose concentrate and a salt/gum blend. This final blend is heated to 77° C., homogenized at 172/34 bars, held at 80° C. to reach desired firmness, and packed.

The casein enriched fraction is obtained by concentrating pasteurized skimmilk through a 0.1 micron spiral MF membrane at 15° C. to a total solids of 15%. The MF retentate has a composition of 8.7% protein (7.6% casein), 0.15% fat, 4.7% lactose, 1.45% ash.

As found in FIG. 8, the final cream cheese includes about 32.8% total solids, about 20% fat, about 5.0% protein, about 5.10% lactose, about 2.35% casein and a protein to fat ratio of about 0.25.

Example 10

Manufacture of Cream Cheese with Approximately 10% Fat

Figure 9:
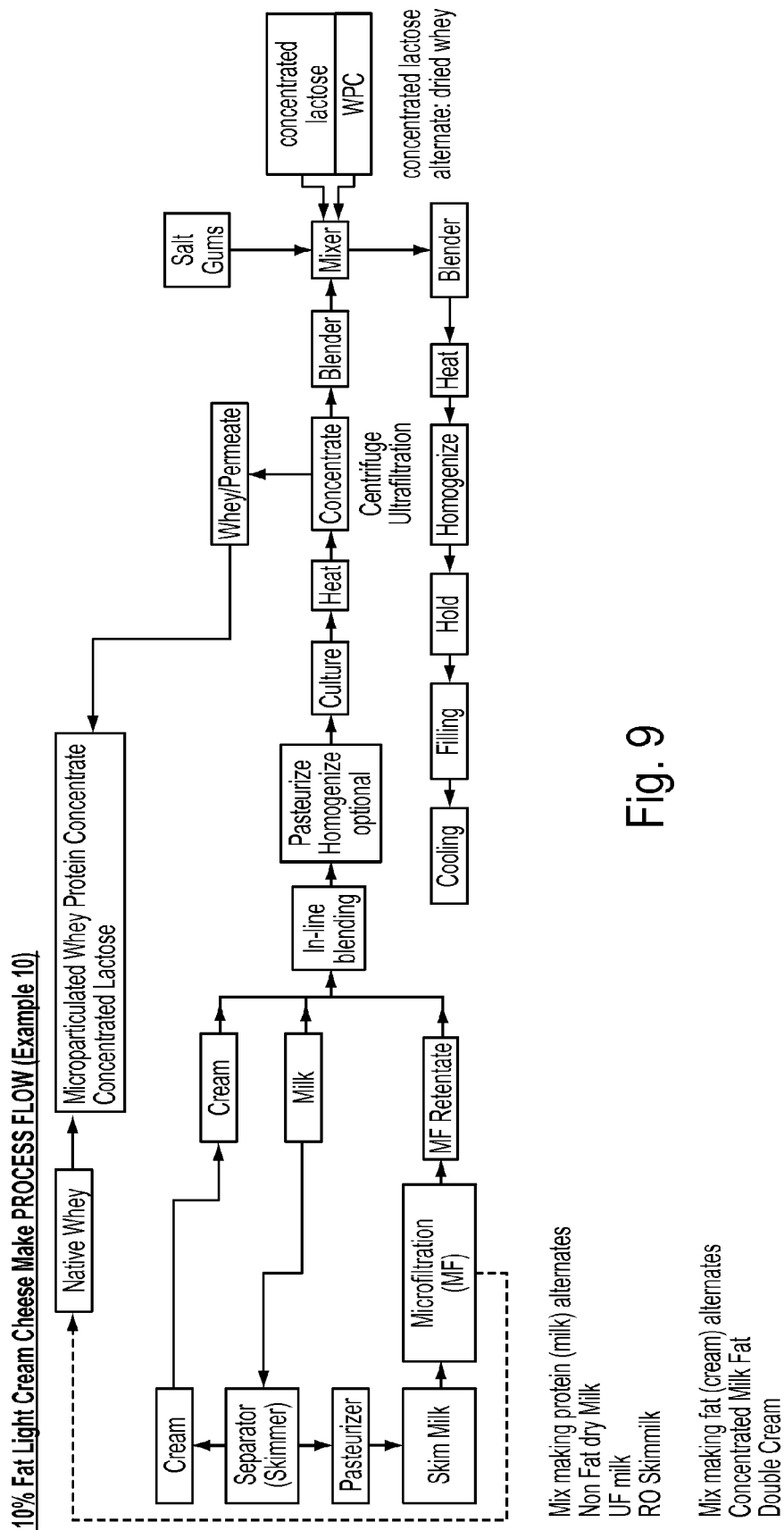
FIG. 9 is a flow diagram illustrating the processing steps for another form of cream cheese.

Processing steps and compositional breakdown for the cream cheese in Example 10 are found in FIGS. 9 and 10. In Example 10, raw milk is combined with cream, which is recycled from further upstream in the process, along with microfiltered retentate as a casein-enriched fraction to produce an initial starting dairy mix. This mix is then pre-heated to 60° C., pasteurized at 80° C. for 35 sec and cooled to culturing temperature of 21° C. The blend is cultured overnight to pH 4.6. The cultured mix is then concentrated via ultrafiltration to a total solids of 26%. The concentrated cultured mix is combined with microparticulated whey protein concentrate and evaporated lactose and a salt/gum blend. The final blend is heated to 75° C., homogenized at 310/34 bars, held at 80° C. to reach desired firmness, and packed.

The casein enriched fraction is obtained by concentrating pasteurized skimmilk through a 0.1 micron spiral MF membrane at 15° C. to a total solids of 15%. The MF retentate has a composition of 8.7% protein (7.6% casein), 0.15% fat, 4.7% lactose, 1.45% ash. As found in FIG. 10, the final cream cheese includes about 26.7% total solids, about 10.2% fat, about 7.9% protein, about 5.2% lactose, about 4.83% casein and a protein to fat ratio of about 0.77.

Example 11

Manufacture of Cream Cheese with approximately 10% Fat

Figure 11:
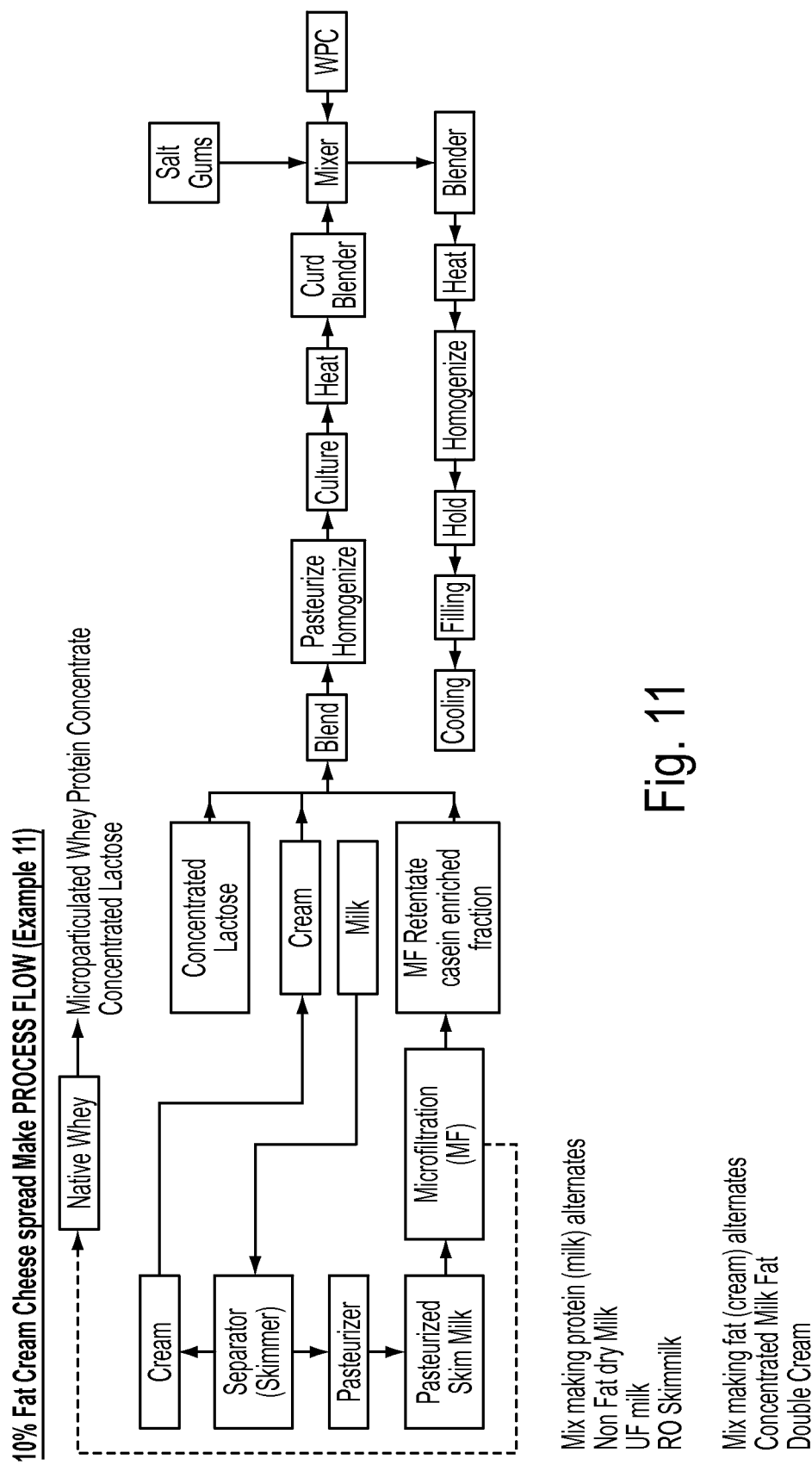
FIG. 11 is a flow diagram illustrating processing steps for another form of cream cheese.

Processing steps and compositional breakdown for the cream cheese in Example 11 are found in FIGS. 11 and 12. In Example 11, concentrated lactose and cream are combined with microfiltered retentate as a casein-enriched fraction to produce an initial starting dairy mix. The mix is pre-heated to 61° C., homogenized at 124/35 bars, pasteurized at 82° C. for 20 sec and cooled to culturing temperature. The blend is then cultured overnight to pH 4.7. The cultured dairy mix is combined with microparticulated whey protein concentrate, salt and gums. The final blend is heated to 73° C., homogenized at 310/34 bars, held at 80° C. to reach desired firmness, and packed.

The casein enriched fraction is obtained by concentrating pasteurized skimmilk through a 0.1 micron spiral MF membrane at 15° C. to a total solids of 18%. The MF retentate has a composition of 11.5% protein (9.3% casein), 0.2% fat, 4.5% lactose, 1.74% ash.

As found in FIG. 12, the final cream cheese includes about 27.8% total solids, about 10.2% fat, about 8.6% protein, about 5.3% lactose, about 5.6% casein and a protein to fat ratio of about 0.84.

Example 12

Manufacture of Cream Cheese with Approximately 3% Fat

Figure 13:
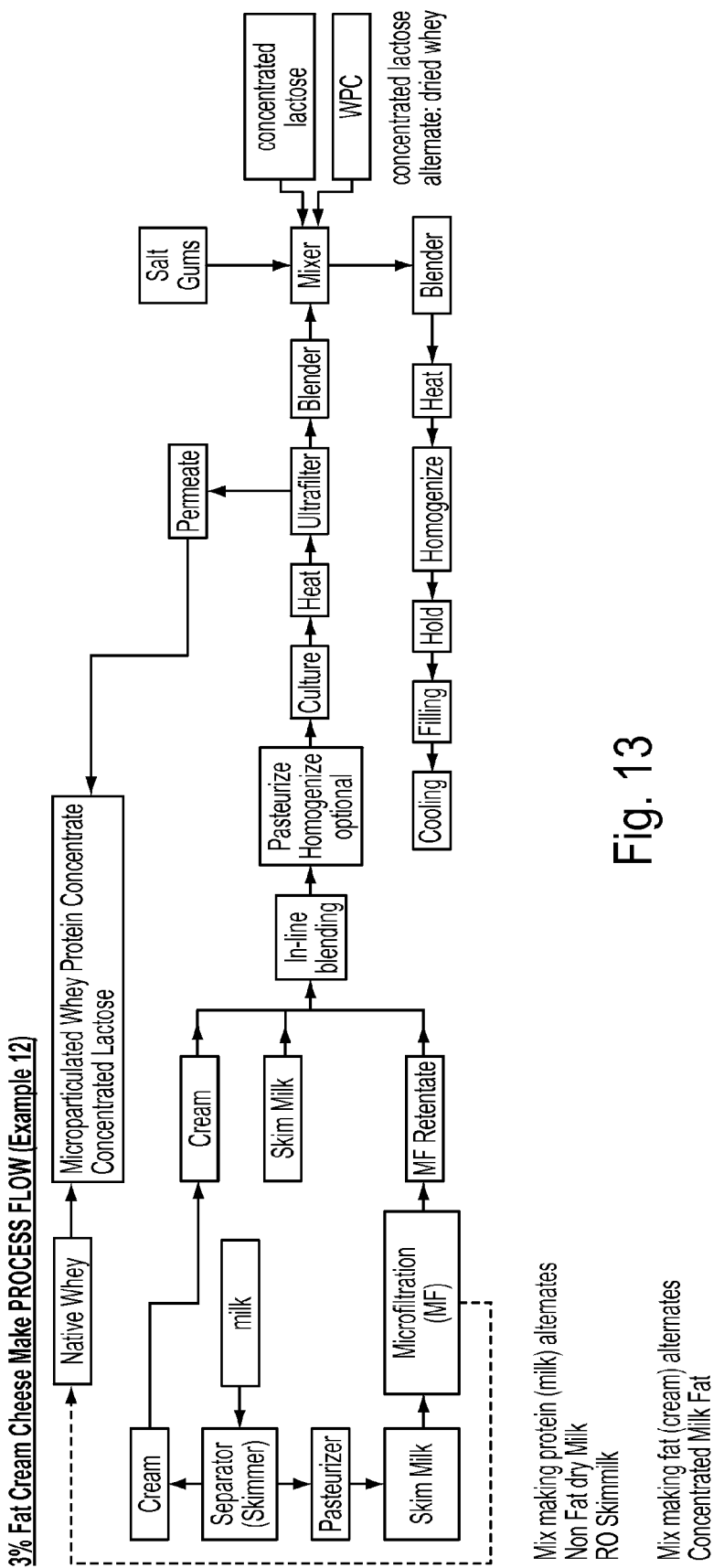
FIG. 13 is a flow diagram illustrating processing steps for another form of cream cheese.

Processing steps and compositional breakdown for the cream cheese in Example 12 are found in FIGS. 13 and 14. In Example 12, skimmilk, cream and microfiltered retentate as a casein-enriched fraction are combined to produce an initial starting dairy mix. This mix is then preheated to 60° C., pasteurized at 80° C. for 35 sec, cooled to culturing temperature. The mix is then cultured overnight to pH 4.6. The cultured mix is then concentrated via ultrafiltration. The concentrated cultured mix is then combined with microparticulated whey protein concentrate, lactose concentrate and salt and gums. The final blend is then heated to 70 C, homogenized at 310/34 bars and held at 76° C. until desired firmness, and then packed.

The casein enriched fraction was obtained by concentrating pasteurized skimmilk through a 0.1 micron spiral MF membrane at 15° C. to a total solids of 15%. The MF retentate had a composition of 8.7% protein (7.6% casein), 0.15% fat, 4.7% lactose, 1.45% ash.

As found in FIG. 14, the final cream cheese includes about 23.7% total solids, about 2.9% fat, about 11% protein, about 6% lactose, about 5.1% casein and a protein to fat ratio of about 3.77.

What is claimed is:

1. A process for producing cream cheese comprising the steps of:
   separating skim milk by means of microfiltration to produce a casein-enriched milk fraction and a whey protein fraction,
   preparing a milk blend,
   subjecting the milk blend to fermentation to form a fermented milk blend,
   separating the fermented milk blend into a curd fraction and a liquid fraction, or further processing the fermented milk blend, without separation, as a curd fraction, and
   preparing cream cheese from the curd fraction,
   wherein the casein-enriched milk fraction is used in the preparation of the milk blend and microparticulated whey protein concentrate is added as a liquid dairy component to the curd fraction.

2. The process according to claim 1, wherein the milk blend comprises milk, cream and the casein-enriched milk fraction.

3. The process according to claim 1, wherein the milk blend is fermented with lactic acid bacteria.

4. The process according to claim 1, comprising a step of adding one or more further cream cheese ingredients to the curd fraction.

5. The process according to claim 1, comprising a step of homogenizing the curd fraction.

6. The process according to claim 5, comprising a texturizing step following the homogenizing step.

7. The process according to claim 1, wherein the liquid fraction is a whey fraction and the process comprises the steps of separating the whey fraction into a whey protein concentrate fraction and a lactose/minerals fraction, subjecting the whey protein concentrate fraction to microparticulation and adding the microparticulated whey protein concentrate fraction to the curd fraction.

8. The process according to claim 7, comprising the steps of separating the lactose/minerals fraction into a lactose fraction and a minerals fraction and adding to the curd one or both of the lactose fraction and the minerals fraction, either fully or in part.

9. The process according to claim 7, comprising the steps of concentrating the lactose/minerals fraction into a concentrated lactose/minerals fraction and adding to the curd the concentrated lactose/minerals fraction, either fully or in part.

10. The process according to claim 1, comprising the step of adding one or both of cream and sour cream as cream cheese ingredient to the curd.

11. A process for preparing a food product comprising cream cheese and one or more additional food product components, said process comprising the steps of producing cream cheese in accordance with claim 1 and combining the cream cheese thus produced with the one or more additional food product components.

12. The process according to claim 2, wherein the milk is pasteurized milk.

13. The process according to claim 1, wherein the separation of the fermented milk blend into the curd fraction and the liquid fraction is effected by means of ultrafiltration or centrifugation.

14. The process according to claim 7, wherein the separation of the whey fraction into the whey protein concentrate fraction and the lactose/minerals fraction is effected by means of ultrafiltration.

15. The process according to claim 8, wherein the separation of the lactose/minerals fraction into the lactose fraction and the minerals fraction is effected by means of a sequence of nanofiltration and reverse osmosis or nanofiltration and evaporation.

16. The process according to claim 9, wherein the concentration of the lactose/minerals fraction into the concentrated lactose/minerals fraction is effected by means of reverse osmosis or evaporation.

17. A process for producing cream cheese comprising the steps of:
   separating skim milk by means of microfiltration to produce a casein-enriched milk fraction and a whey protein fraction,
   preparing a milk blend,
   subjecting the milk blend to fermentation to form a fermented milk blend,
   separating the fermented milk blend into a curd fraction and a liquid fraction, or further processing the fermented milk blend, without separation, as a curd fraction, and
   preparing cream cheese from the curd fraction,
   wherein the casein-enriched milk fraction is used in the preparation of the milk blend and microparticulated whey protein concentrate is added as a liquid dairy component to the curd fraction,
   wherein the cream cheese has a (calcium+phosphorus)/casein weight ratio of ≥0.05, a whey protein/true protein weight ratio of ≥0.25, a potassium content of ≥140 mg/100 g, and a lactose content of ≥3.5 g/100 g.

18. A process for producing cream cheese comprising the steps of:
   separating skim milk by means of microfiltration to produce a casein-enriched milk fraction and a whey protein fraction,
   preparing a milk blend, subjecting the milk blend to fermentation to form a fermented milk blend,
separating the fermented milk blend into a curd fraction and a liquid fraction, and
preparing cream cheese from the curd fraction,
wherein the casein-enriched milk fraction is used in the preparation of the milk blend and microparticulated whey protein concentrate is added as a liquid dairy component to the curd fraction.

\* \* \* \* \*